(12) United States Patent
Kim et al.

(10) Patent No.: US 9,596,485 B2
(45) Date of Patent: Mar. 14, 2017

(54) MOTION PICTURE ENCODING/DECODING APPARATUS, ADAPTIVE DEBLOCKING FILTERING APPARATUS AND FILTERING METHOD FOR SAME, AND RECORDING MEDIUM

(75) Inventors: Hayoon Kim, Seongnam-si (KR); Yungho Choi, Anyang-si (KR); Yoonsik Choe, Goyang-si (KR); Yonggoo Kim, Seoul (KR); Byongho Kim, Seoul (KR); Junhyuk Ahn, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 965 days.

(21) Appl. No.: 13/126,144

(22) PCT Filed: Oct. 22, 2009

(86) PCT No.: PCT/KR2009/006127
§ 371 (c)(1),
(2), (4) Date: Apr. 26, 2011

(87) PCT Pub. No.: WO2010/050699
PCT Pub. Date: May 6, 2010

(65) Prior Publication Data
US 2011/0200100 A1    Aug. 18, 2011

(30) Foreign Application Priority Data

Oct. 27, 2008  (KR) .................. 10-2008-0105062
Oct. 28, 2008  (KR) .................. 10-2008-0105718

(51) Int. Cl.
*H04N 7/12*       (2006.01)
*H04N 19/86*      (2014.01)
(Continued)

(52) U.S. Cl.
CPC .......... *H04N 19/86* (2014.11); *H04N 19/117* (2014.11); *H04N 19/14* (2014.11); *H04N 19/176* (2014.11); *H04N 19/61* (2014.11); *H04N 19/82* (2014.11)

(58) Field of Classification Search
None
See application file for complete search history.

(56) References Cited

U.S. PATENT DOCUMENTS 7,995,868 B2 * 8/2011 Hasegawa .............. H04N 9/045
                                                    382/260
2005/0201633 A1 * 9/2005 Moon et al. ................ 382/268
(Continued)

FOREIGN PATENT DOCUMENTS

KR    1020050091270 A    9/2005

OTHER PUBLICATIONS

International Search Report mailed Jun. 14, 2010 for PCT/KR2009/006127.

*Primary Examiner* — Joseph Ustaris
*Assistant Examiner* — Edemio Navas, Jr.
(74) *Attorney, Agent, or Firm* — Hauptman Ham, LLP

(57) ABSTRACT

A video encoding/decoding apparatus, an adaptive deblocking filtering apparatus and a filtering method for same, and a recording medium are disclosed. The filtering apparatus includes: a boundary strength determiner for determining strength of boundaries between subblocks of current block; a direction selector for selecting multiple directions preset with reference to the boundary sequentially; a filtering pixel selector for selecting pixels for filtering based on selected directions; a filtering determiner for determining whether to perform the filtering for the selected directions depending on relationships between pixel values of selected pixels; and a filtering unit for filtering the selected pixels in the selected directions depending on the determination of whether to (Continued)

perform filtering to apply pixel-wide deblocking filtering in a plurality of directions as well as in vertical and horizontal directions, thus effectively removing block distortions resulting from a diagonal discontinuity caused by edges in a plurality of diagonal directions.

12 Claims, 39 Drawing Sheets

(51) Int. Cl.
  *H04N 19/176* (2014.01)
  *H04N 19/61* (2014.01)
  *H04N 19/117* (2014.01)
  *H04N 19/14* (2014.01)
  *H04N 19/82* (2014.01)

(56) References Cited

U.S. PATENT DOCUMENTS

| | | | |
|---|---|---|---|
| 2006/0045185 A1* | 3/2006 | Kiryati et al. | 375/240.16 |
| 2006/0262979 A1* | 11/2006 | Srinivasan et al. | 382/232 |
| 2007/0025448 A1* | 2/2007 | Cha et al. | 375/240.24 |
| 2007/0223591 A1* | 9/2007 | Doshi | H04N 19/86 375/240.24 |
| 2008/0043853 A1 | 2/2008 | Kawa | |
| 2008/0095244 A1 | 4/2008 | Kim | |
| 2008/0193024 A1 | 8/2008 | Lee | |
| 2009/0080517 A1* | 3/2009 | Ko | H04N 19/176 375/240.03 |

* cited by examiner (a) 9 DEBLOCKING FILTERING DIRECTIONS FOR
HORIZONTAL BOUNDARY BLOCK BOUNDARY (b) 9 DEBLOCKING FILTERING DIRECTIONS FOR
VERTICAL BOUNDARY

VERTICAL BLOCK BOUNDARY

HORIZONTAL BLOCK BOUNDARY

IN CASE OF VERTICAL BLOCK
BOUNDARY (a)

IN CASE OF HORIZONTAL BLOCK
BOUNDARY (b)

(a)

(b)

☐ 4 X 4 BLOCK FOR NONAPPLICATION OF DEBLOCKING FILTER

▨ 4 X 4 BLOCK FOR APPLICATION OF DEBLOCKING FILTER

⌇⌇⌇⌇ BOUNDARY OF 4 X 4 BLOCK

→ BOUNDARIES OF PIXELS TO PERFORM FILTERING

① NUMBER FOR EACH BOUNDARY OF 4 × 4 BLOCK (a) 9 DEBLOCKING FILTERING DIRECTIONS FOR
HORIZONTAL BOUNDARY BLOCK BOUNDARY (b) 9 DEBLOCKING FILTERING DIRECTIONS FOR
VERTICAL BOUNDARY

VERTICAL BLOCK BOUNDARY

HORIZONTAL BLOCK BOUNDARY

IN CASE OF VERTICAL BLOCK
BOUNDARY (a)

IN CASE OF HORIZONTAL BLOCK
BOUNDARY (b)

(a)

(b)

MOTION PICTURE ENCODING/DECODING APPARATUS, ADAPTIVE DEBLOCKING FILTERING APPARATUS AND FILTERING METHOD FOR SAME, AND RECORDING MEDIUM

CROSS REFERENCE TO RELATED APPLICATION

This application claims the priority of Korean Patent Application No. 10-2008-0105062, filed on Oct. 27, 2008, and Korean Patent Application No. 10-2008-0105718, filed on Oct. 28, 2008, in the KIPO (Korean Intellectual Property Office), the disclosure of which are incorporated herein in their entirety by reference. Further, this application is the National Phase application of International Application No. PCT/KR2009/006127, filed Oct. 22, 2009, which designates the United States and was published in Korean. Each of these applications is hereby incorporated by reference in their entirety into the present application.

TECHNICAL FIELD

The present disclosure relates to a video encoding/decoding apparatus. More particularly, the present disclosure relates to a video encoding/decoding apparatus, an adaptive deblocking filtering apparatus and a filtering method for same, and a recording medium deblocking filter and a filtering method for same which are effective to remove blocking artifacts occurring in coding apparatuses using a block based discrete cosine transform and a quantization.

BACKGROUND ART

The descriptions in this section merely provide background information related to the present disclosure and may not constitute prior art.

Generally, the most commercial video compression methods and their apparatuses (H.263, H.264, MPEG-4, and H.264/AVC) use discrete cosine transform (DCT) to remove spatial redundancies in videos. At this time, transform in units of nonoverlapping blocks involves the DCT and the quantization performed independently of any correlations considered existing between adjacent blocks or pixels causing data loss and structured discontinuities of pixel values in a boundary between blocks in a low bit rate video having an especially high quantized value in a clearly visible blocking phenomenon which is called a blocking artifact. Blocking artifacts not only significantly degrade the video quality but also badly lower the video compression performance through the block distortion embedded and stored in a frame memory and the video degradation propagated to the fullest from referencing to the video in the process of motion compensation.

For this reason, a solution has been offered to use a low pass filter for smoothing boundary errors between the blocks as a way to reduce the blocking artifacts before storing a decoded image in the reference frame memory in an encoder and also to improve the image quality in a decoder and such a technique is called a deblocking filter.

However, if there exists an edge in an image at a block boundary or an onscreen object is present and the deblocking filter is applied thereto, the original image may be damaged at its component edge causing a degradation of the video quality.

In view of this, a deblocking filter in H.264/AVC video codec adaptively performs filtering at every boundary of blocks with the 4×4 pixels being the unit by which DCT and quantization are carried out. More specifically, the filtering was not adopted when a block boundary was determined as being an edge of an actual image or a boundary of an object, but the filtering was adopted when the boundary was a distortion due to the blocking artifact, in order to deal with the stated problems.

However, because the deblocking filter of H.264/AVC determines the presence of an edge only in vertical and horizontal directions, once the edge or the object boundary lies in the diagonal direction, discontinuities occur at diagonally located pixels in the boundary region between blocks leaving the concern for the blocking artifacts to occur.

DISCLOSURE

Technical Problem

Therefore, the present disclosure has been made for removing the blocking artifacts and thus improving the video quality by determinations of edge directions pixel-wide not only in vertical and horizontal directions but various other directions at the block boundaries through providing a video encoding/decoding apparatus, an adaptive deblocking filtering apparatus and a filtering method for same, and a recording medium.

In addition, the present disclosure has been made for providing a video encoding/decoding apparatus, an adaptive deblocking filtering apparatus and a filtering method for same, and a recording medium, which effectively reduce the amount of computation for removing the blocking artifacts to facilitate the implementation of the disclosure in an apparatus having a limited computation capacity.

Technical Solution

One aspect of the present disclosure provides an adaptive deblocking filtering apparatus including: a boundary strength determiner for determining strength of boundaries between subblocks of a current block; a direction selector for selecting a number of directions preset with reference to the boundary individually and sequentially; a filtering pixel selector for selecting pixels for filtering based on selected directions; a filtering determiner for performing a determination of whether to perform the filtering for the selected directions depending on relationships between pixel values of selected pixels; and a filtering unit for performing the filtering with respect to the selected pixels in the selected directions depending on the determination of whether to perform the filtering.

Another aspect of the present disclosure provides an adaptive deblocking filtering method including: determining strength of boundaries between subblocks of a current block; selecting a number of directions preset with reference to the boundary individually and sequentially; selecting pixels for filtering based on selected directions; determining a filtering by performing a determination of whether to perform the filtering for the selected directions depending on relationships between pixel values of selected pixels; and performing the filtering with respect to the selected pixels in the selected directions depending on the determination of whether to perform the filtering.

The filtering unit or the step of determining the filtering may determine the selected directions as a filtering direction if the relationships between pixel values of selected pixels satisfies a condition that an absolute value of a pixel value difference between two first pixels facing each other with reference to the boundary, an absolute value of a pixel value difference between a second pixel and a first pixel both at one side with reference to the boundary, and an absolute value of a pixel value difference between a second pixel and a first pixel at another side with reference to the boundary are smaller than thresholds respectively preset.

In an occasion that the filtering direction is determined to be multiple, the filtering unit or the step of performing filtering may perform the filtering in selected one or more of multiple filtering directions depending on pixel value changes or variances between the selected pixels.

The number of directions preset may include 45 degrees, 56.25 degrees, 67.5 degrees, 78.75 degrees, 90 degrees, 101.25 degrees, 112.5 degrees, 123.75 degrees, and 135 degrees.

Yet another aspect of the present disclosure provides a video encoding apparatus including: a predictor for predicting a current block of an image to generate a predicted block; a subtractor for subtracting the predicted block from the current block to generate a residual block; a transformer for performing a transform on the residual block into a frequency domain; a quantizer for performing a quantization on the residual block after the transform; an encoder for encoding the residual block after the quantization; an inverse quantizer for performing an inverse quantization on the residual block; an inverse transformer for performing an inverse transform on the residual block after the inverse quantization into a residual block having pixel signals on time axis; an adder for adding the predicted block to the residual block after the inverse transform to perform a reconstruction of the current block; and a deblocking filtering unit for deblocking-filtering the current block after the reconstruction through selecting pixels for filtering by the number of directions preset with reference to the boundary of the current block having been reconstructed, performing a determination of whether to perform the filtering for corresponding directions depending on relationships between pixel values of selected pixels, and performing the filtering with respect to the selected pixels in the corresponding directions depending on the determination of whether to perform the filtering.

Yet another aspect of the present disclosure provides a video decoding apparatus including: a decoder for decoding a bitstream to extract a residual block; an inverse quantizer for performing an inverse quantization on the residual block; an inverse transformer for performing an inverse transform on the residual block after the inverse quantization; a predictor for predicting a current block to generate a predicted block; an adder for adding the predicted block to the residual block after the inverse transform to perform a reconstruction of the current block; and a deblocking filtering unit for deblocking-filtering the current block after the reconstruction by the adder through selecting pixels for filtering by the number of directions preset with reference to the boundary of the current block, performing a determination of whether to perform the filtering for corresponding directions depending on relationships between pixel values of selected pixels, and performing the filtering with respect to the selected pixels in the corresponding directions depending on the determination of whether to perform the filtering.

The deblocking filtering unit of the video encoding/decoding apparatus may determine the corresponding directions as a filtering direction if the relationships between pixel values of selected pixels satisfies a condition that an absolute value of a pixel value difference between two first pixels facing each other with reference to the boundary, an absolute value of a pixel value difference between a second pixel and a first pixel both at one side with reference to the boundary, and an absolute value of a pixel value difference between a second pixel and a first pixel at another side with reference to the boundary are smaller than thresholds respectively preset.

Yet another aspect of the present disclosure provides a computer readable medium storing a computer program including functions of: determining strength of boundaries between subblocks of a current block; selecting a number of directions preset with reference to the boundary individually and sequentially; selecting pixels for filtering based on selected directions; performing a determination of whether to perform the filtering for the selected directions depending on relationships between pixel values of selected pixels; and performing the filtering with respect to the selected pixels in the selected directions depending on the determination of whether to perform the filtering.

The function of performing a determination of whether to perform the filtering may determine the selected directions as a filtering direction if the relationships between pixel values of selected pixels satisfies a condition that an absolute value of a pixel value difference between two first pixels facing each other with reference to the boundary, an absolute value of a pixel value difference between a second pixel and a first pixel both at one side with reference to the boundary, and an absolute value of a pixel value difference between a second pixel and a first pixel at another side with reference to the boundary are smaller than thresholds respectively preset.

Yet another aspect of the present disclosure provides a deblocking filtering apparatus including: a boundary strength determiner for determining strength of boundaries between subblocks of a current block; a filtering direction determiner for selecting an optimal direction among a number of directions preset respectively for pixels in the boundaries of the subblocks based on pixel value changes between the pixels corresponding respectively to the directions, and determining a most selected direction among a number of selected optimal directions with respect to all of the pixels in the boundaries of the subblocks, as a determined filtering direction of a corresponding subblock; and a filtering unit for performing a selection of pixels for filtering based on the determined filtering direction with respect to each of the pixels in the boundaries of the subblocks, performing a determination of whether to perform the filtering for the determined filtering direction depending on relationships between pixel values of selected pixels, and performing the filtering with respect to the selected pixels in the determined filtering direction depending on the determination of whether to perform the filtering.

The filtering direction determiner may calculate the pixel value changes based on an absolute value of a pixel value difference between two first pixels facing each other with reference to a corresponding boundary, an absolute value of a pixel value difference between a second pixel and a first pixel both at one side with reference to the corresponding boundary, an absolute value of a pixel value difference between a second pixel and a first pixel at another side with reference to the corresponding boundary, an absolute value of a pixel value difference between a third pixel and the second pixel at the one side with reference to the corresponding boundary, and an absolute value of a pixel value difference between a third pixel and the second pixel at the another side with reference to the corresponding boundary, and select among the directions one with a smallest pixel value change as the optimal direction.

The filtering unit may perform the filtering in the determined filtering direction if the relationships between pixel values of the selected pixels satisfies a condition that an absolute value of a pixel value difference between two first pixels facing each other with reference to a corresponding boundary, an absolute value of a pixel value difference between a second pixel and a first pixel both at one side with reference to the corresponding boundary, and an absolute value of a pixel value difference between a second pixel and a first pixel at another side with reference to the corresponding boundary are smaller than thresholds respectively preset.

In an occasion that the determined filtering direction cannot satisfy the condition, the filtering unit may perform a check if vertical direction of the corresponding boundary can satisfy the condition, and in accordance with a result of the check, perform the filtering.

The number of directions preset may include 45 degrees, 56.25 degrees, 67.5 degrees, 78.75 degrees, 90 degrees, 101.25 degrees, 112.5 degrees, 123.75 degrees, and 135 degrees.

The filtering direction determiner may record the determined filtering direction as additional information for the corresponding subblock or have the pixels after the filtering in the determined filtering direction among the pixels in the boundaries of corresponding subblocks assigned with additional information and recorded.

Yet another aspect of the present disclosure provides a deblocking filtering apparatus including: a boundary strength determiner for determining strength of boundaries between subblocks of a current block; a filtering direction determiner for selecting a direction as a determined filtering direction among a number of directions preset, with respect to a first pixel in the boundaries of the subblocks based on pixel value changes between the pixels corresponding respectively to the directions; and determining a latest and most selected direction for a current subblock as a determined filtering direction, or determining a direction right ahead of the latest and most selected direction as the determined filtering direction, or determining a filtering direction according to the selecting of the direction of the first pixel, with respect to a second and later ones of the pixels in the boundaries of the subblocks; and a filtering unit for performing a selection of pixels for filtering based on the determined filtering direction with respect to each of the pixels in the boundaries of the subblocks, performing a determination of whether to perform the filtering for the determined filtering direction depending on relationships between pixel values of selected pixels, and performing the filtering with respect to the selected pixels in the determined filtering direction depending on the determination of whether to perform the filtering.

Yet another aspect of the present disclosure provides a deblocking filtering method including: determining strength of boundaries between subblocks of a current block; selecting an optimal direction among a number of directions preset respectively for pixels in the boundaries of the subblocks based on pixel value changes between the pixels corresponding respectively to the directions; determining a most selected direction among a number of selected optimal directions with respect to all of the pixels in the boundaries of the subblocks, as a determined filtering direction of a corresponding subblock; performing a selection of pixels for filtering based on the determined filtering direction with respect to each of the pixels in the boundaries of the subblocks; performing a determination of whether to perform the filtering for the determined filtering direction depending on relationships between pixel values of selected pixels; and performing the filtering with respect to the selected pixels in the determined filtering direction depending on the determination of whether to perform the filtering.

Yet another aspect of the present disclosure provides a deblocking filtering method including: determining strength of boundaries between subblocks of a current block; selecting a direction as a first determined filtering direction among a number of directions preset, with respect to a first pixel in the boundaries of the subblocks based on pixel value changes between the pixels corresponding respectively to the directions; determining a latest and most selected direction for a current subblock as a second determined filtering direction, or determining a direction right ahead of the latest and most selected direction as an optimal filtering direction, or determining a filtering direction according to the selecting of the direction of the first pixel, with respect to a second and later ones of the pixels in the boundaries of the subblocks; performing a selection of pixels for filtering based on the determined filtering direction with respect to each of the pixels in the boundaries of the subblocks; performing a determination of whether to perform the filtering for the determined filtering direction depending on relationships between pixel values of selected pixels; and performing the filtering with respect to the selected pixels in the determined filtering direction depending on the determination of whether to perform the filtering.

Yet another aspect of the present disclosure provides a video encoding apparatus including: a predictor for predicting a current block of an image to generate a predicted block; a subtractor for subtracting the predicted block from the current block to generate a residual block; a transformer for performing a transform on the residual block into a frequency domain; a quantizer for performing a quantization on the residual block after the transform; an encoder for encoding the residual block after the quantization; an inverse quantizer for performing an inverse quantization on the residual block; an inverse transformer for performing an inverse transform on the residual block after the inverse quantization into a residual block having pixel signals on time axis; an adder for adding the predicted block to the residual block after the inverse transform to perform a reconstruction of the current block; and a deblocking filtering unit for deblocking-filtering the current block after the reconstruction through selecting an optimal direction among a number of directions preset respectively for pixels in the boundaries of the subblocks of the current block having been reconstructed based on pixel value changes between the pixels corresponding respectively to the directions, determining a most selected direction among a number of selected optimal directions with respect to all of the pixels in the boundaries of the subblocks as a determined filtering direction of a corresponding subblock, performing a selection of pixels for filtering based on the determined filtering direction with respect to each of the pixels in the boundaries of the subblocks, performing a determination of whether to perform the filtering for the determined filtering direction depending on relationships between pixel values of selected pixels, and performing the filtering with respect to the selected pixels in the determined filtering direction depending on the determination of whether to perform the filtering.

Yet another aspect of the present disclosure provides a video encoding apparatus including: a predictor for predicting a current block of an image to generate a predicted block; a subtractor for subtracting the predicted block from the current block to generate a residual block; a transformer for performing a transform on the residual block into a frequency domain; a quantizer for performing a quantization on the residual block after the transform; an encoder for encoding the residual block after the quantization; an inverse quantizer for performing an inverse quantization on the residual block; an inverse transformer for performing an inverse transform on the residual block after the inverse quantization into a residual block having pixel signals on time axis; an adder for adding the predicted block to the residual block after the inverse transform to perform a reconstruction of the current block; and a deblocking filtering unit for deblocking-filtering the current block after the reconstruction through selecting a direction as a determined filtering direction among a number of directions preset, with respect to a first pixel in the boundaries of the subblocks of the current block after the reconstruction based on pixel value changes between the pixels corresponding respectively to the directions; determining a latest and most selected direction for a current subblock as a determined filtering direction, or determining a direction right ahead of the latest and most selected direction as the determined filtering direction, or determining a filtering direction according to the selecting of the direction of the first pixel, with respect to a second and later ones of the pixels in the boundaries of the subblocks; performing a selection of pixels for filtering based on the determined filtering direction with respect to each of the pixels in the boundaries of the subblocks; performing a determination of whether to perform the filtering for the determined filtering direction depending on relationships between pixel values of selected pixels; and performing the filtering with respect to the selected pixels in the determined filtering direction depending on the determination of whether to perform the filtering.

Yet another aspect of the present disclosure provides a video decoding apparatus including: a decoder for decoding a bitstream to extract a residual block; an inverse quantizer for performing an inverse quantization on the residual block; an inverse transformer for performing an inverse transform on the residual block after the inverse quantization; a predictor for predicting a current block to generate a predicted block; an adder for adding the predicted block to the residual block after the inverse transform to perform a reconstruction of the current block; and a deblocking filtering unit for deblocking-filtering the current block after the reconstruction through selecting a determined optimal direction among a number of directions preset, with respect to a pixel corresponding to additional information in receipt among all of pixels in the boundaries of the subblocks of the current block having been reconstructed based on pixel value changes between the pixels corresponding respectively to the directions, determining the determined optimal direction as a determined filtering direction of a corresponding subblock, performing a selection of pixels for filtering based on the determined filtering direction with respect to each of the pixels in the boundaries of the subblocks, performing a determination of whether to perform the filtering for the determined filtering direction depending on relationships between pixel values of selected pixels, and performing the filtering with respect to the selected pixels in the determined filtering direction depending on the determination of whether to perform the filtering.

Yet another aspect of the present disclosure provides a video decoding apparatus including: a decoder for decoding a bitstream to extract a residual block; an inverse quantizer for performing an inverse quantization on the residual block; an inverse transformer for performing an inverse transform on the residual block after the inverse quantization; a predictor for predicting a current block to generate a predicted block; an adder for adding the predicted block to the residual block after the inverse transform to perform a reconstruction of the current block; and a deblocking filtering unit for deblocking-filtering the current block after the reconstruction by the adder through performing a selection of pixels for filtering based on a filtering direction received as additional information of a corresponding subblock with respect to each of the pixels in the boundaries of the subblocks of the current block having been reconstructed, performing a determination of whether to perform the filtering for the determined filtering direction depending on relationships between pixel values of selected pixels, and performing the filtering with respect to the selected pixels in the determined filtering direction depending on the determination of whether to perform the filtering.

Yet another aspect of the present disclosure provides a video decoding apparatus including: a decoder for decoding a bitstream to extract a residual block; an inverse quantizer for performing an inverse quantization on the residual block; an inverse transformer for performing an inverse transform on the residual block after the inverse quantization; a predictor for predicting a current block to generate a predicted block; an adder for adding the predicted block to the residual block after the inverse transform to perform a reconstruction of the current block; and a deblocking filtering unit for deblocking-filtering the current block after the reconstruction by the adder through selecting a direction as a determined filtering direction among a number of directions preset, with respect to a first pixel in the boundaries of the subblocks of the current block after the reconstruction based on pixel value changes between the pixels corresponding respectively to the directions; determining a latest and most selected direction for a current subblock as a determined filtering direction, or determining a direction right ahead of the latest and most selected direction as the determined filtering direction, or determining a filtering direction according to the selecting of the direction of the first pixel, with respect to a second and later ones of the pixels in the boundaries of the subblocks; performing a selection of pixels for filtering based on the determined filtering direction with respect to each of the pixels in the boundaries of the subblocks; performing a determination of whether to perform the filtering for the determined filtering direction depending on relationships between pixel values of selected pixels; and performing the filtering with respect to the selected pixels in the determined filtering direction depending on the determination of whether to perform the filtering.

Yet another aspect of the present disclosure provides a computer readable medium storing a computer program including functions of: determining strength of boundaries between subblocks of a current block; selecting an optimal direction among a number of directions preset respectively for pixels in the boundaries of the subblocks based on pixel value changes between the pixels corresponding respectively to the directions; determining a most selected direction among a number of selected optimal directions with respect to all of the pixels in the boundaries of the subblocks, as a determined filtering direction of a corresponding subblock; performing a selection of pixels for filtering based on the determined filtering direction with respect to each of the pixels in the boundaries of the subblocks; performing a determination of whether to perform the filtering for the determined filtering direction depending on relationships between pixel values of selected pixels; and performing the filtering with respect to the selected pixels in the determined filtering direction depending on the determination of whether to perform the filtering.

Yet another aspect of the present disclosure provides a computer readable medium storing a computer program including functions of: determining strength of in the boundaries of subblocks of a current block; selecting a direction as a first determined filtering direction among a number of directions preset, with respect to a first pixel in the boundaries of the subblocks based on pixel value changes between the pixels corresponding respectively to the directions; determining a latest and most selected direction for a current subblock as a second determined filtering direction, or determining a direction right ahead of the latest and most selected direction as an optimal filtering direction, or determining a filtering direction according to the selecting of the direction of the first pixel, with respect to a second and later ones of the pixels in the boundaries of the subblocks; performing a selection of pixels for filtering based on the determined filtering direction with respect to each of the pixels in the boundaries of the subblocks; performing a determination of whether to perform the filtering for the determined filtering direction depending on relationships between pixel values of selected pixels; and performing the filtering with respect to the selected pixels in the determined filtering direction depending on the determination of whether to perform the filtering.

Advantageous Effects

According to the disclosure as described above, it is possible to remove the block distortion phenomenon by the diagonal discontinuities arising from a number of diagonal edges through the application of the deblocking filter pixel-wide not only in the vertical and horizontal directions but also in multiple other directions.

According to aspect of the disclosure, a significant reduction is obtained in the amount of computation for removing the block distortion phenomenon.

MODE FOR INVENTION

Figure 1:
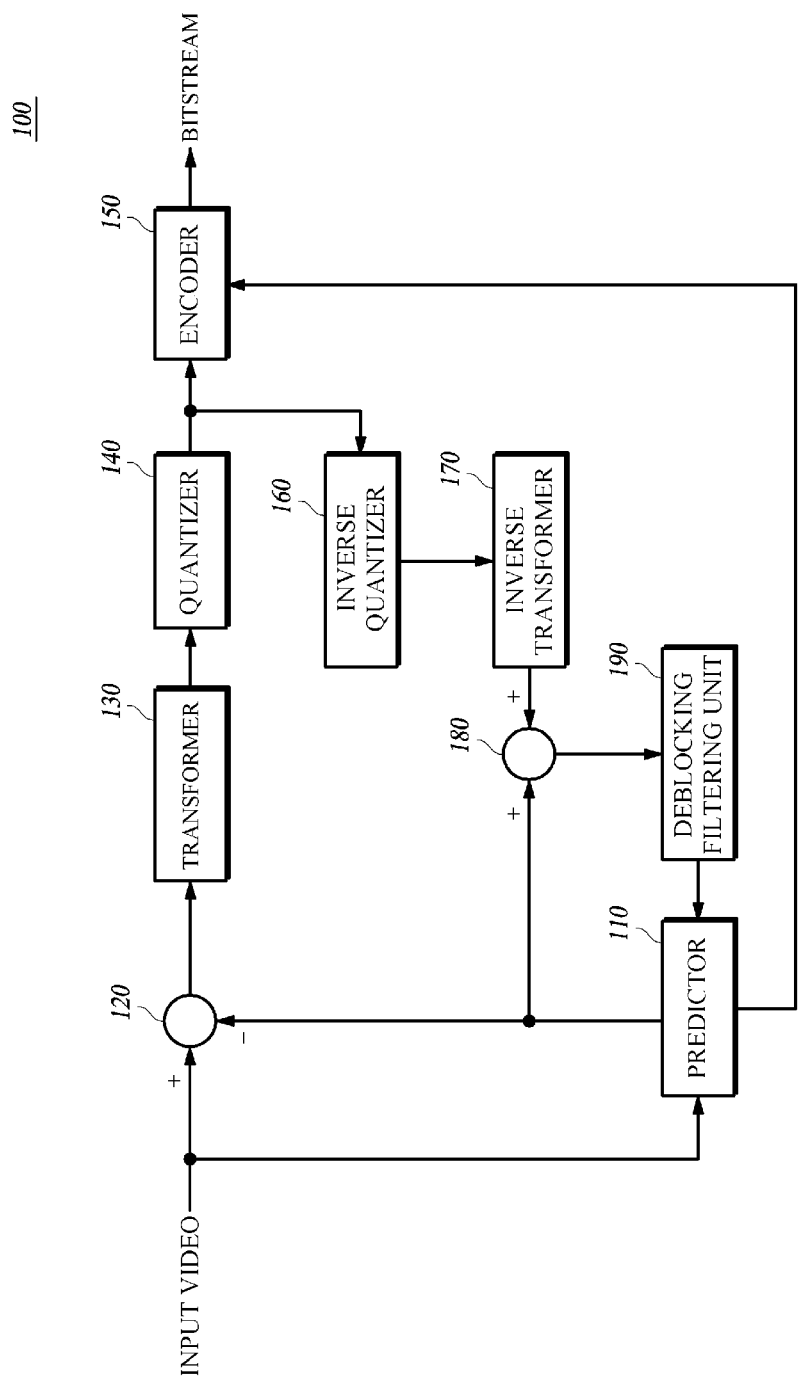
FIG. 1 is a block diagram of a video encoding apparatus according to an aspect.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Since a video on a screen is composed of as much as thirty frames per second causing a short inter-frame interval, human eyes cannot distinguish between the frames. For this reason, casting the thirty frames within a second will make the observing eyes believe the frames are a continuous movement.

If there is such a similarity between a previous frame and a current frame, it is possible to make a prediction of a pixel value of one frame from a known value of a pixel constituting a preceding frame (This kind of prediction is called an inter prediction carried out between frames).

Such video data encoding and decoding are performed based on the technology of motion prediction. Motion prediction is carried out in a way of referencing to a past frame on a time axis or to both of the past frame and a future frame. The reference frame is a frame that is used as a reference for encoding or decoding a current frame. Additionally, in the block-based video coding, a still image (frame) forming the video is divided into macroblocks and subblocks which constitute the macroblock so that the image is motion-predicted and encoded in units of a block.

Prediction of a next pixel is also possible within a same frame by taking advantage of the correlations among pixel signals (This kind of prediction is called an intra prediction carried out inside a frame).

FIG. 1 is a block diagram for showing a video encoding apparatus 300 according to an aspect.

Referring to FIG. 1, video encoding apparatus 100 may comprise a predictor 110, a subtractor 120, a transformer 130, a quantizer 140, an encoder 150, an inverse quantizer 160, an inverse transformer 170, an adder 180, and a deblocking filtering unit 190.

Video encoding apparatus 100 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, predictor 110 may predict the current block (or macroblock) by using either one or combined both of the motion prediction-based inter prediction and the intra prediction for predicting a subsequent pixel by taking advantage of the correlations among the pixel signals within a same frame.

For example, predictor 310 may be formed by two divided sections of a motion estimator (not shown) and a motion compensator (not shown). The motion estimator searches the predicted value of a motion of the current frame macroblock from the reference frame and outputs their motion difference as a motion vector. In other words, the desired macroblock to find is searched for within a predetermined search area of the reference frame to identify the closest macroblock and its degree of motion is outputted as the motion vector. From the reference frame, the motion compensator gets a predicted macroblock corresponding to the obtained motion vector.

Alternatively, predictor 110 may be an intra predictor which predicts the current macroblock of the current frame by using macroblocks neighboring the current block, and it predicts the predicted macroblock by calculating predicted pixel values of the respective pixels in the current block using one or more pixel values of one or more adjacent macroblocks. Here, the adjacent macroblocks may be one or more macroblocks which were compressed previously of the current macroblock and are neighboring the current macroblock.

Subtractor 120 subtracts the predicted macroblock from the current block to generate a residual block. In other words, subtractor 120 calculates the difference between the original pixel value of each pixel of the current block and the predicted pixel value of each pixel of the predicted block to generate a residual block having residual signals.

Transformer 130 transforms the residual block into frequency domain. That is, transformer 130 transforms the residual block into the frequency domain to generate a residual block with frequency coefficients. Here, transformer 130 in transforming the residual signal may use Hadamard transform, discrete cosine transform (DCT) based transform and various other transform techniques which transform image signals on the time axis to those on the frequency axis, wherein the transformed residual signals into the frequency domain transform are the frequency coefficients.

Quantizer 140 performs a quantization on the transformed residual block from transformer 130. That is, quantizer 140 quantizes the frequency coefficient of the residual block to generate a quantized frequency coefficient. Here, in quantizing the frequency coefficient of the residual block, quantizer 140 may use a method such as dead zone uniform threshold quantization (DZUTQ), quantization weighted matrix, or their improved quantization methods.

Encoder 150 encodes the frequency coefficients of the residual block quantized by quantization unit 140 to generate a bitstream. In addition, upon receiving the motion vector and the rotation information delivered from predictor 110, encoder 150 may encode the same together with the frequency coefficients of the quantized residual block to output the bitstream. For this encoding operation, entropy coding technology may be used though not limited thereto and a variety of different coding techniques could be used.

Inverse quantizer 160 performs an inverse quantization on the quantized residual block from quantizer 130. In other words, inverse quantizer 160 inversely quantizes the quantized frequency coefficients of the quantized residual block to generate the frequency coefficients.

Inverse transformer 170 performs an inverse transform on the inversely quantized residual block from inverse quantizer 160. In other words, inverse transformer 170 inversely transforms the inversely quantized frequency coefficients of residual block to reconstruct the residual block having the pixel signals in the time axis.

Adder 180 adds the predicted block from predictor 110 to the inversely transformed residual block from inverse transformer 170 to reconstruct the current block.

Deblocking filtering unit 190 performs a deblocking filtering with respect to the current block reconstructed by adder 180. Here, deblocking filtering means a task for reducing a block distortion generated during encoding of an image by the unit of block whereby a deblocking filter may be applied to the block boundary and macroblock boundary together or macroblock boundary only and alternatively the deblocking filter may be omitted. The current block that is reconstructed by adder 180 and then deblocking-filtered by deblocking filtering unit 190 in this way may be inputted to predictor 110 and stored therein as a reference picture for use in predicting the subsequent picture.

Deblocking filtering unit 190 according to an aspect of the present disclosure deblocking-filters a current block, and in particular it selects pixels for filtering by a number of directions preset with reference to the boundary of the current block, decides whether to perform the filtering for corresponding directions depending on relationships between pixel values of selected pixels, and performs the filtering with respect to the selected pixels in the corresponding directions depending on the determination of whether to perform the filtering. Deblocking filtering unit 190 determines the corresponding directions as filtering directions if the relationships between pixel values of the pixels selected by the respective directions satisfies a condition that an absolute value of a pixel value difference between two first pixels facing each other with reference to the boundary, an absolute value of a pixel value difference between a second pixel and a first pixel both at one side with reference to the boundary, and an absolute value of a pixel value difference between a second pixel and a first pixel at another side with reference to the boundary are smaller than thresholds respectively preset. Deblocking filtering unit 190 as above will be described in more detail referring to FIG. 2.

Figure 2:
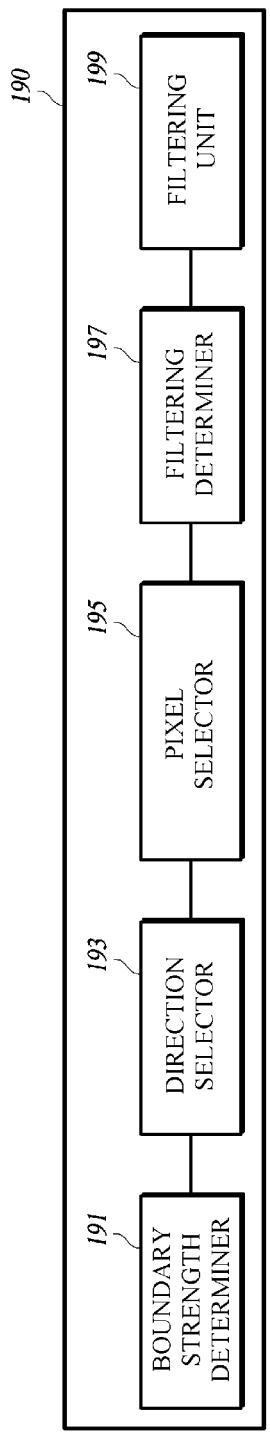
FIG. 2 is a block diagram of an adaptive deblocking filtering apparatus according to an aspect.

FIG. 2 is a block diagram of an adaptive deblocking filtering apparatus according to an aspect which corresponds to deblocking filtering unit 190 in FIG. 1 and is referenced by the same number 190.

As shown in FIG. 2, adaptive deblocking filter 190 according to an aspect includes a boundary strength determiner 191, a direction selector 193, a pixel selector 195, a filtering determiner 197, and a filtering unit 199.

Boundary strength determiner 191 determines boundary strength (BS) of the boundaries between subblocks of the current block according to the characteristics of the block enclosing pixels at the block boundary at the current location. The BS is valued between 0 and 4 and its determination is specified in the H.264/AVC standard document. That is, boundary strength determiner 191 determines the BS at the boundary of each block and determines in what strength it would apply the filtering. The BS is valued between 0 and 4 depending on whether the block enclosing the boundary for currently filtering uses the intra prediction encoding method, or depending on the differential distance of the reference block for motion compensation in case of using the inter prediction encoding.

Figure 3:
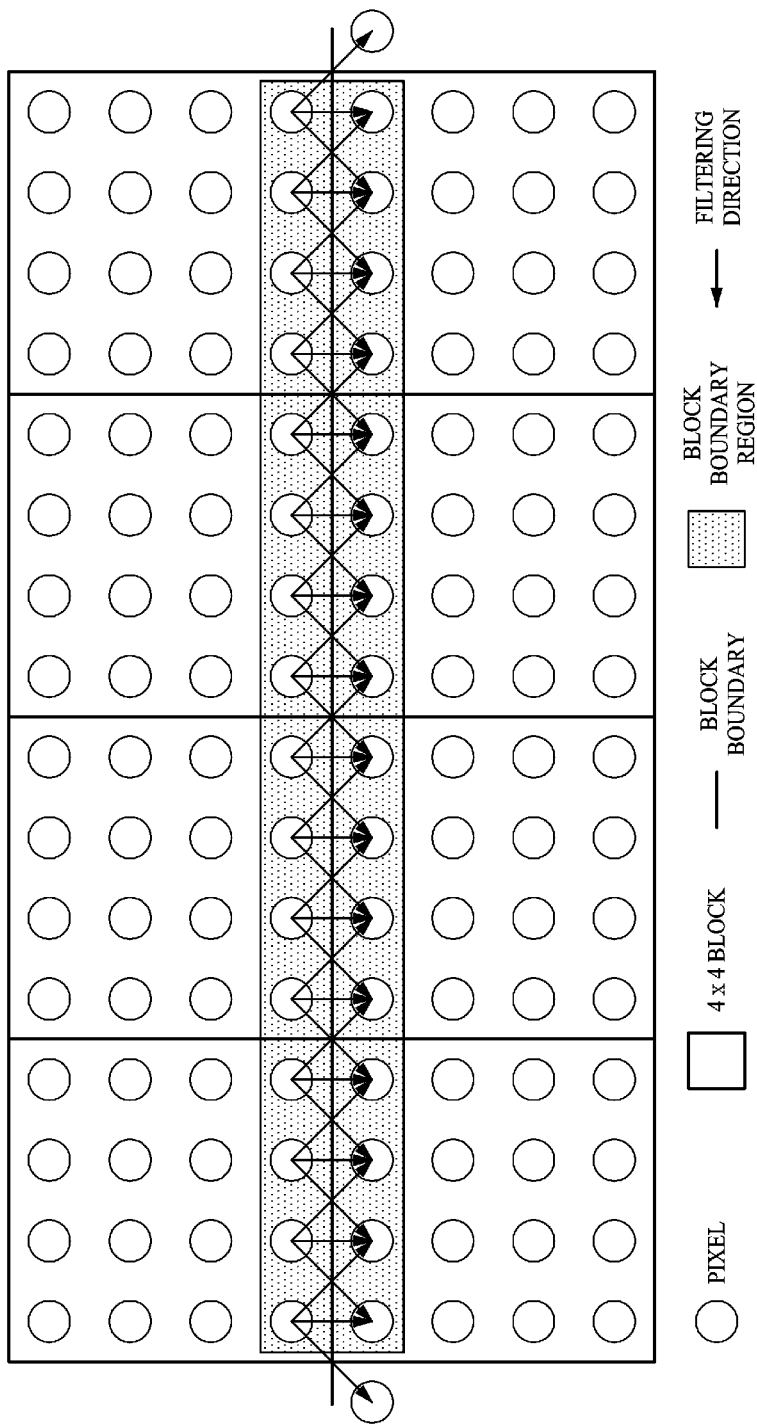
FIG. 3 is a diagram of an exemplary filtering direction according to an aspect.
Figure 5:
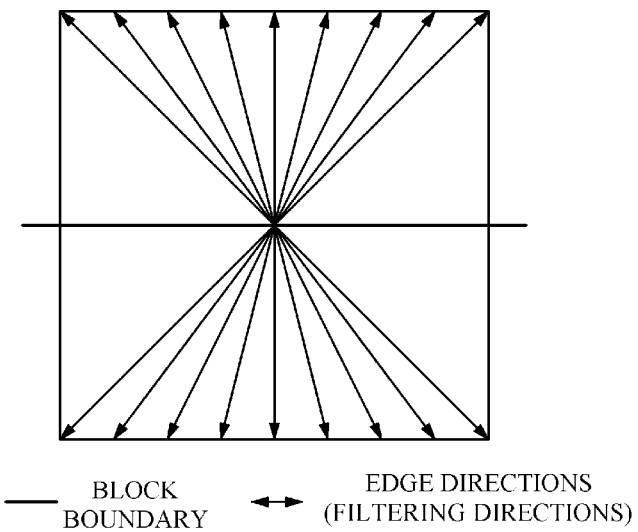
FIG. 5 is a diagram of another example of filtering directions according to an aspect.
Figure 5:
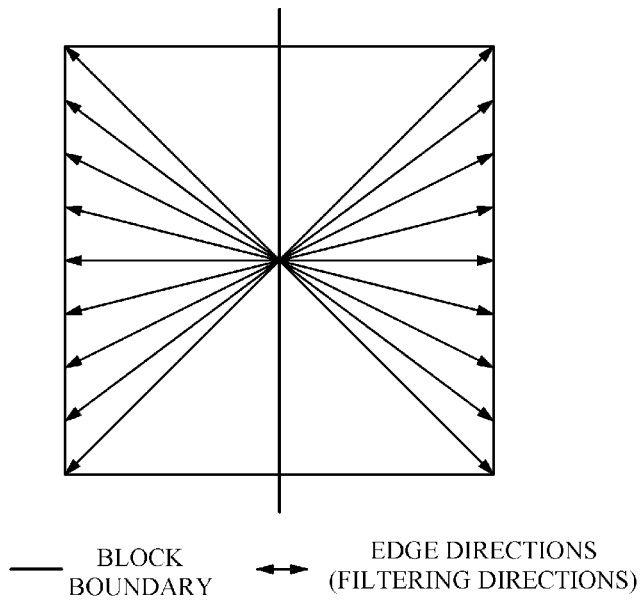

Direction selector 193 selects a number of directions preset with reference to the boundary individually and sequentially. That is, direction selector 193 may preset three filtering directions of 45 degrees, 90 degrees, and 135 degrees with reference to the block boundary for example as shown in FIG. 3 and makes the sequential selection, or preset nine filtering directions of 45 degrees, 56.25 degrees, 67.5 degrees, 78.75 degrees, 90 degrees, 101.25 degrees, 112.5 degrees, 123.75 degrees, and 135 degrees with reference to the horizontal or vertical boundary as shown in FIG. 5 and makes the sequential selection of the nine directions one by one.

Pixel selector 195 selects pixels for filtering based on selected directions in direction selector 193. That is, for a selected one of three filtering directions of 45 degrees, 90 degrees, and 135 degrees, pixel selector 195 selects filtering pixels as in FIG. 4, or otherwise selects filtering pixels as in FIG. 5 for a selected one of nine filtering directions of 45 degrees, 56.25 degrees, 67.5 degrees, 78.75 degrees, 90 degrees, 101.25 degrees, 112.5 degrees, 123.75 degrees, and 135 degrees.

Filtering determiner 197 determines whether to perform the filtering for the corresponding directions selected in direction selector 193 depending on relationships between pixel values of selected pixels in pixel selector 195. Specifically, filtering determiner 197 determines the selected directions in direction selector 193 as a filtering direction if the relationships between pixel values of selected pixels in pixel selector 195 satisfies a condition that an absolute value of a pixel value difference between two first pixels facing each other with reference to the corresponding boundary, an absolute value of a pixel value difference between a second pixel and a first pixel both at one side with reference to the corresponding boundary, and an absolute value of a pixel value difference between a second pixel and a first pixel at the other side with reference to the corresponding boundary are smaller than thresholds respectively preset. A specific example of the process of determining whether to perform filtering will follow.

Filtering unit 199 performs the filtering with respect to the selected pixels in the selected directions depending on the determination of whether to perform the filtering by filtering determiner 197 which may involve multiple selected directions in its determination, where the filtering may be performed in more than one direction upon selection.

Figure 15:
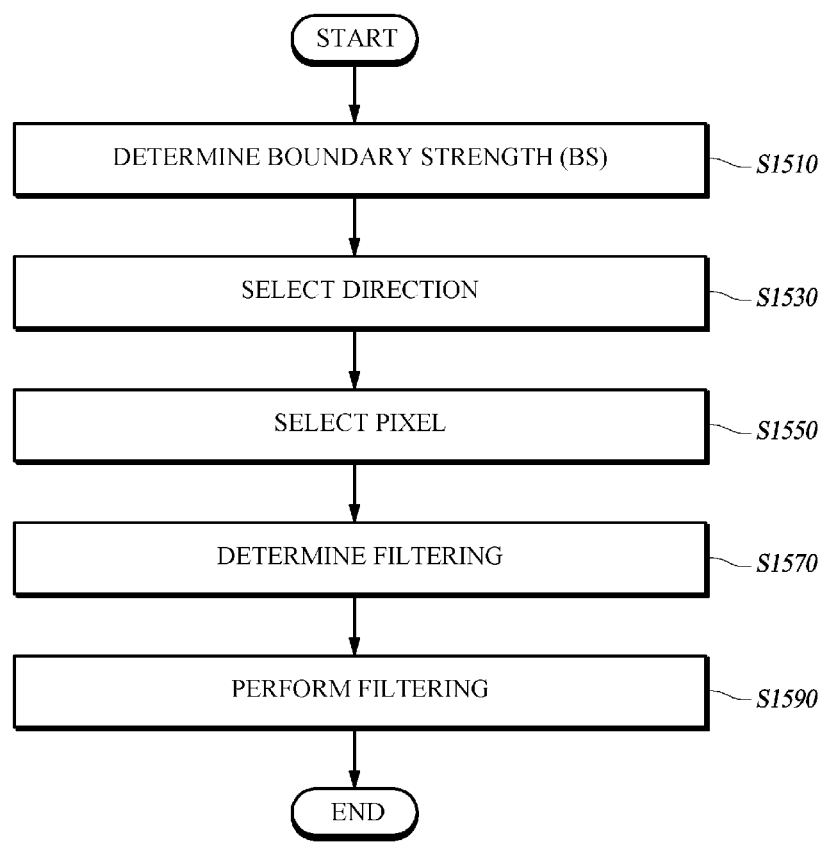
FIG. 15 is a flow diagram of an adaptive deblocking filtering method according to an aspect.

FIG. 15 is a flow diagram of an adaptive deblocking filtering method according to an aspect which is applicable to deblocking filter unit in FIG. 2 and will be described together with its operation.

For the purpose of the present description, a brief description will be provided on the deblocking filtering method of H.264 ("Advanced video coding for generic audiovisual services", Draft, ITU-T Recommendation H.264, March, 2005, p. 182~p. 194).

Figure 16:
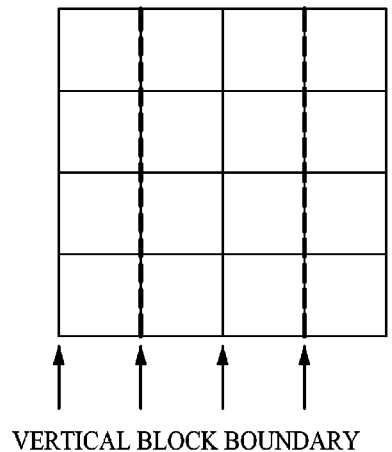
FIGS. 16 and 17 are diagrams of a vertical boundary and a horizontal boundary of a macroblock, respectively.
Figure 17:
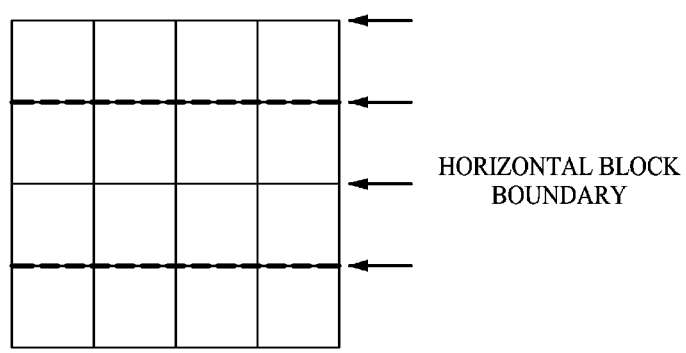

The deblocking filtering method of H.264, with reference to a boundary of a unit 4×4 block for DCT and quantization, first takes a vertical filtering as in FIG. 16, and then takes a horizontal filtering as in FIG. 17.

Figure 18:
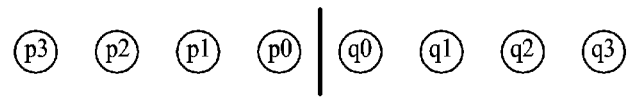
FIG. 18 is a diagram of exemplary pixels for a horizontal filtering and a vertical filtering in the cases of a vertical and a horizontal block boundaries.
Figure 18:
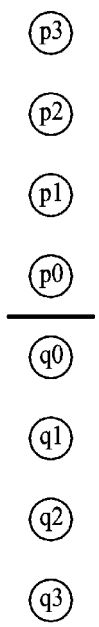

Before applying the deblocking filter, considering a block made of pixels p0~p3 and a block of pixels q0~q3 as in FIG. 18, a determination is made on the boundary strength BS for the boundary of each block and on what strength of filtering is to be applied depending on each BS. The value of BS is determined between 0 and 4 depending on whether the block enclosing the boundary for currently filtering uses the intra prediction encoding method, or depending on the differential distance of the reference block for motion compensation in case of using the inter prediction encoding.

Upon determining the BS, a determination is made on whether to perform the filtering by determining whether the pixels at the boundaries between the respective blocks are a distorted boundary or an existing edge in the actual image. Using the following Equation 1 and upon its dissatisfaction, H.264 recognizes the existing edge in the actual image and holds a filtering, but with a satisfaction of the Equation it concludes the boundary is distorted by a blocking artifact and performs the deblocking filtering.

① $BS > 0$

② $|p_0 - q_0| < \alpha; |p_1 - p_0| < \beta; |q_1 - q_0| < \beta$ [Equation 1]

Here, $\alpha$, $\beta$ are values determined adaptively by a quantization parameter and mean threshold values to help determine if the current boundary is either a pixel difference from a blocking artifact or the result of an actual edge. In the case of a larger quantization level causing a greater scale of the blocking artifact, the threshold is supposed to be set greater.

Once it is determined whether to perform the filtering, a low-band filterer is used according to the strength value of the block boundary for a smoothing process with respect to pixels across the boundary. An exemplary calculation method for the filtering may be same as described in H.264 ("Advanced video coding for generic audiovisual services", Draft, ITU-T Recommendation H.264, March, 2005, p. 182~p. 194).

As stated above, H.264 deblocking filter determines the filter strength by the encoding properties of the blocks, applies Equation 1 to the block boundary to determine the presence of an edge for adaptively performing the deblocking filtering for the respective boundaries while preserving the best of the edge component, whereby reducing the blocking artifacts. However, this limited deblocking filtering in the horizontal and vertical directions cannot correct the distortion from the blocking artifacts caused by a diagonal discontinuity.

Figure 19:
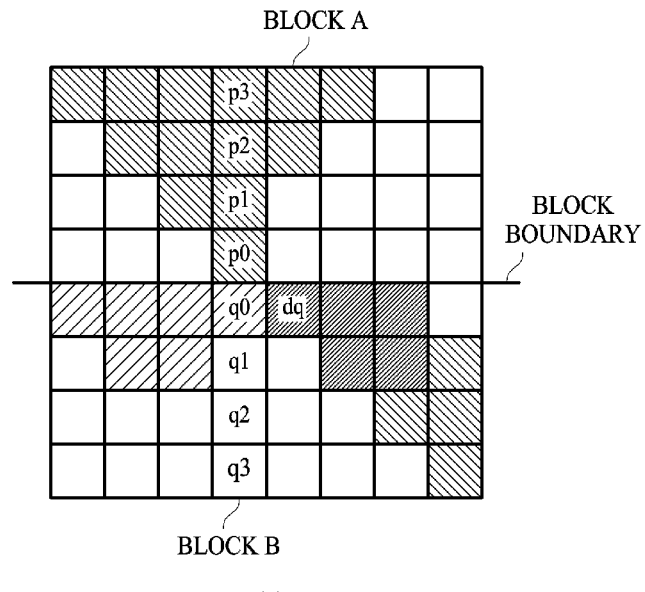
FIG. 19 is a diagram of a diagonal edge assumed to be present and illustrated at (a) with a vertical filtering and (b) with a diagonal filtering.
Figure 19:
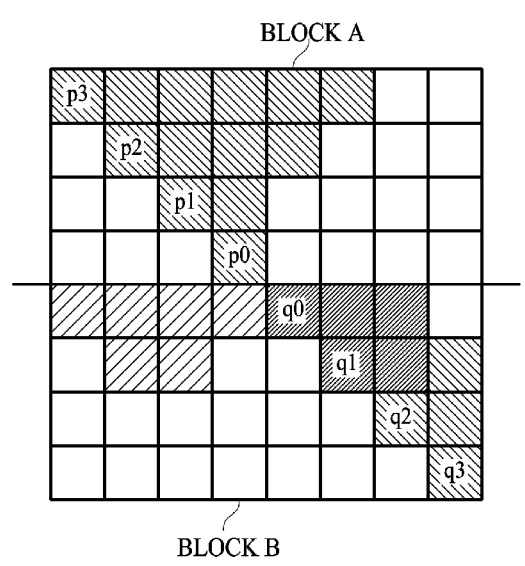

To be more specific, when performing the deblocking filtering only in the conventional horizontal and vertical directions and in the case of FIG. 19 at (a) where the block boundary contains a diagonal edge component, Equation 1 as applied to the boundary made of pixels p0~p3 and pixels q0~q3 will not be satisfied with an edge determined to hold the filtering. However, if block A and block B have the block strength valued 1 or more, it is visible that the blocking artifact causes diagonal discontinuity of pixel values notwithstanding pixels p0 and dq0 are equally valued pixels. Therefore, to solve the blocking artifact due to the diagonal discontinuity of pixel values, it is necessary to perform the deblocking filtering not only in the vertical and horizontal directions but also in the diagonal direct adaptively. To be further specific, if a low-band filtering is applied to the boundary diagonally as in FIG. 19 at (b), the pixel values of p0 and q0 will change similar towards each other and become smooth to resolve the distortions due to the discontinuity of pixel values at the block boundary.

Therefore, the aspects of the disclosure allow performing the deblocking filtering in other directions than the vertical and horizontal directions.

In aspect 1, every pixel of each boundary is checked in three directions to see if it is the boundary by the actual edge or caused by a blocking artifact, and the filtering is performed for all the directions which are considered to have the blocking artifacts.

Aspect 1

For all of the pixels existing in the entire boundaries in vertical and horizontal directions of FIGS. 16 and 17, the following steps 1 through 5 are carried out.

Step 1: Boundary strength determiner 191 in step S1510 of determining the boundary strength BS determines the BS for the boundary of 4×4 blocks. If BS is 0, no deblocking filtering is assumed but if it is 1~4 the condition formula is checked to determine whether to perform the deblocking filtering.

Step 2: Direction selector 193 in step S1530 of determining the direction selects 45 degrees, 90 degrees, and 135 degrees in turn for all of the pixels at the boundary as shown in FIG. 3.

Figure 4:
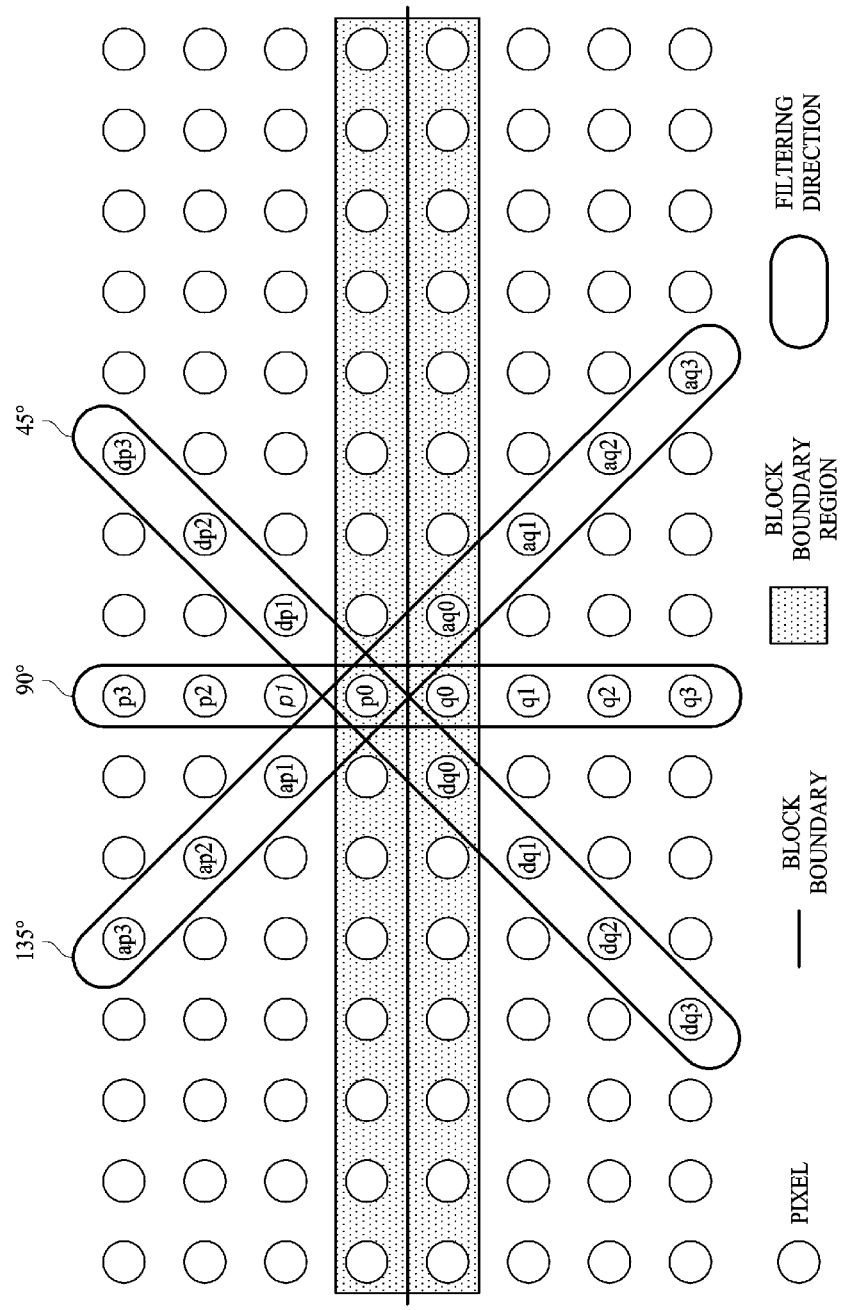
FIG. 4 is a diagram for illustrating pixels selected by the filtering directions of FIG. 3.

Step 3: Pixel selector 195 in step S1550 of selecting the pixel selects the pixels for filtering in the directions selected by direction selector 193 as shown in FIG. 4.

Steps 4 and 5: Filtering determiner 197 in step S1570 for determining the filtering determines whether to performing the filtering for the selected directions by direction selector 193 depending on relationships between pixel values of selected pixels by pixel selector 195, and filtering unit 199 in step S1590 of performing the filtering performs the operation of deblocking filtering with respect to the pixels in the determined directions by filtering determiner 197 in accordance the BS value. In other words, filtering determiner 197 checks if the relationships between pixel values of selected pixels by pixel selector 195 satisfy a preset condition and determines to perform the filtering in the satisfactory directions, and filtering unit 199 performs the deblocking filtering operation with respect to the pixels in the determined directions by filtering determiner 197 in accordance the BS value. Specifically, as shown in FIG. 4, the following [Condition Formula 1], [Condition Formula 2], and [Condition Formula 3] are examined against the directions of 45 degrees, 90 degrees, and 135 degrees respectively, and if satisfactory, the pixels present in the corresponding directions are used to perform the deblocking filtering operation.

$|p_0-dq_0|<\kappa_\alpha\alpha; |dp_1-p_0|<\kappa_\beta\beta;$
$|dq_1-dq_0|<\kappa_\beta\beta$ [Condition Formula 1]

If the direction is 45 degrees, when [Condition Formula 1] is examined satisfied the filtering operation is performed depending on the BS value. At this time, the pixels used for the deblocking filtering operation are present in 45 degrees and they are p0, dp1, dp2, dp3, dq0, dq1, dq2, and dq3. Here, $\kappa_\alpha$ and $\kappa_\beta$ are constant values which control the threshold to adjust the level of performing the deblocking filtering in the diagonal direction.

$|p_0-q_0|<\alpha; p_1-p_0|<\beta; |q_1-q_0|<\beta$ [Condition Formula 2]

If the direction is 90 degrees, when [Condition Formula 2] is examined satisfied the filtering operation is performed depending on the BS value. At this time, the pixels used for the deblocking filtering operation are p0, p1, p2, p3, q0, q1, q2, and q3.

$|p_0-aq_0|<\kappa_\alpha\alpha; |ap_1-p_0|<\kappa_\beta\beta;$
$|aq_1-aq_0|<\kappa_\beta\beta$ [Condition Formula 3]

If the direction is 135 degrees, when [Condition Formula 3] is examined satisfied the filtering operation is performed depending on the BS value. At this time, the pixels used for the deblocking filtering operation are present in 135 degrees and they are p0, ap1, ap2, ap3, aq0, aq1, aq2, and aq3.

Aspect 2 examines every pixel on the respective boundaries for the nine directions to see if it is the boundary by the actual edge or caused by a blocking artifact, and selects the most appropriate direction and performs the filtering in that direction. The following aspect 2 selects one of the nine directions, although selecting multiple directions from other number of directions is within the boundary of the disclosure.

Aspect 2

For all of the pixels existing in the entire boundaries in the vertical and horizontal directions of FIGS. 16 and 17, the following steps 1 through 5 are carried out.

Step 1: Boundary strength determiner 191 in step S1510 of determining the BS determines the BS for the boundary of 4×4 blocks. If BS is 0, no deblocking filtering is assumed but if it is 1~4 the condition formula is checked to determine whether to perform the deblocking filtering.

Step 2: Direction selector 193 in step S1530 of determining the direction selects nine directions of 45 degrees, 56.25 degrees, 67.5 degrees, 78.75 degrees, 90 degrees, 101.25 degrees, 112.5 degrees, 123.75 degrees, and 135 degrees in turn for all of the pixels at the boundary as shown in FIG. 5 at (a) and (b).

Step 3: Pixel selector 195 in step S1550 of selecting the pixel selects the pixels for filtering in the directions selected by direction selector 193 as shown in FIGS. 6 to 14.

Steps 4 and 5: Filtering determiner 197 in step S1570 for determining the filtering determines whether to performing the filtering for the selected directions by direction selector 193 depending on relationships between pixel values of selected pixels by pixel selector 195, and filtering unit 199 in step S1590 of performing the filtering performs the operation of deblocking filtering with respect to the pixels in the determined directions by filtering determiner 197 in accordance the BS value. In other words, filtering determiner 197 checks if the relationships between pixel values of selected pixels by pixel selector 195 satisfy a preset condition and determines to perform the filtering in the satisfactory directions, and filtering unit 199 performs the deblocking filtering operation with respect to the pixels in the determined directions by filtering determiner 197 in accordance the BS value. Specifically, as shown in FIGS. 6 to 14, the following [Condition Formula 4], [Condition Formula 5], [Condition Formula 6], [Condition Formula 7], [Condition Formula 8], [Condition Formula 9], [Condition Formula 10], [Condition Formula 11], and [Condition Formula 12] are examined against the nine directions of 90 degrees, 78.75 degrees, 67.5 degrees, 56.25 degrees, 45 degrees, 101.25 degrees, 112.5 degrees, 123.75 degrees, and 135 degrees respectively, and if satisfactory, the pixels present in the corresponding directions are used to perform the deblocking filtering operation.

The condition formulas for the respective directions are as follows. At this time, $\kappa_{\alpha x}$ and $\kappa_{\beta x}$ are constant values which can control the threshold to adjust the level of performing the deblocking filtering in the respective directions.

Figure 6:
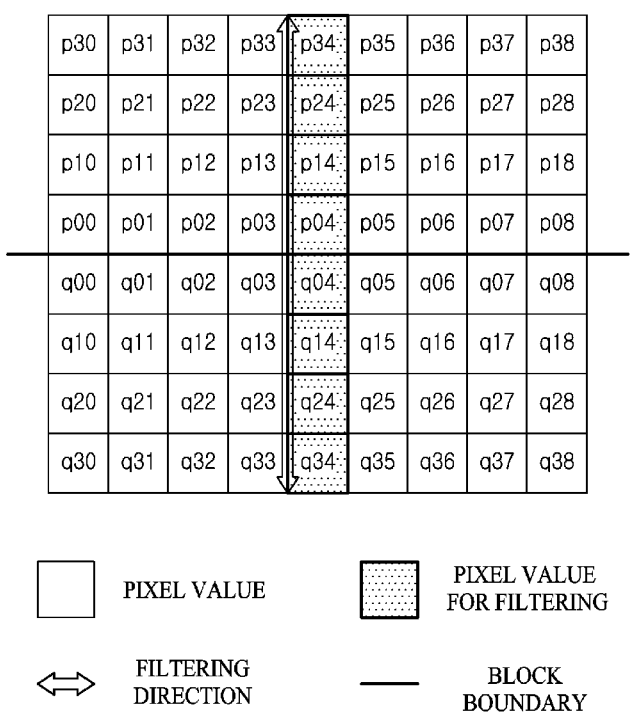
FIGS. 6 to 14 are diagrams for illustrating pixels selected by the filtering directions of FIG. 5.

The formula for 90 degrees of FIG. 6 is [Condition Formula 4].

$$|p_{04}-q_{04}|<\alpha;\ |p_{14}-p_{04}|<\beta;\ |q_{14}-q_{04}|<\beta \quad \text{[Condition Formula 4]}$$

Figure 7:
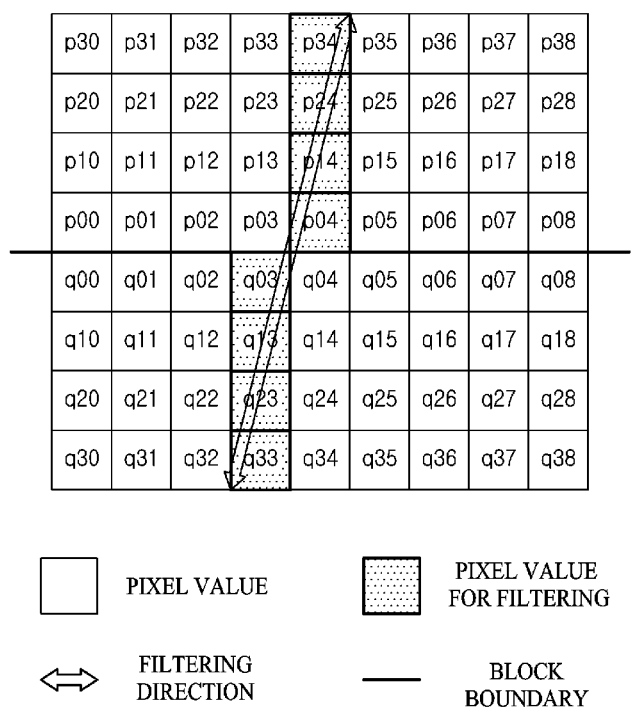

The formula for 78.75 degrees of FIG. 7 is [Condition Formula 5].

$$|p_{04}-q_{03}|<\kappa_{\alpha 1}\alpha;\ |p_{14}-p_{04}|<\kappa_{\beta 1}\beta;\ |q_{13}-q_{03}|<\kappa_{\beta 1}\beta \quad \text{[Condition Formula 5]}$$

Figure 8:
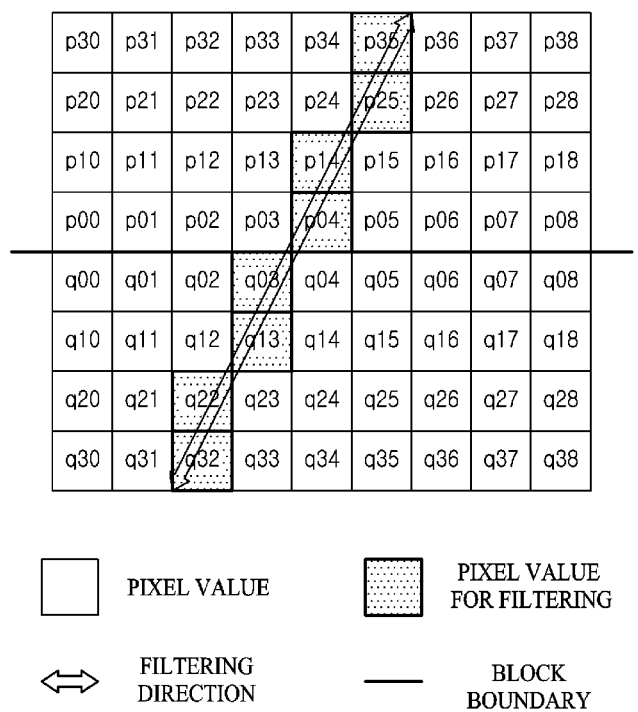

The formula for 67.5 degrees of FIG. 8 is [Condition Formula 6].

$$|p_{04}-q_{03}|<\kappa_{\alpha 2}\alpha;\ |p_{14}-p_{04}|<\kappa_{\beta 2}\beta;\ |q_{13}-q_{03}|<\kappa_{\beta 2}\beta \quad \text{[Condition Formula 6]}$$

Figure 9:
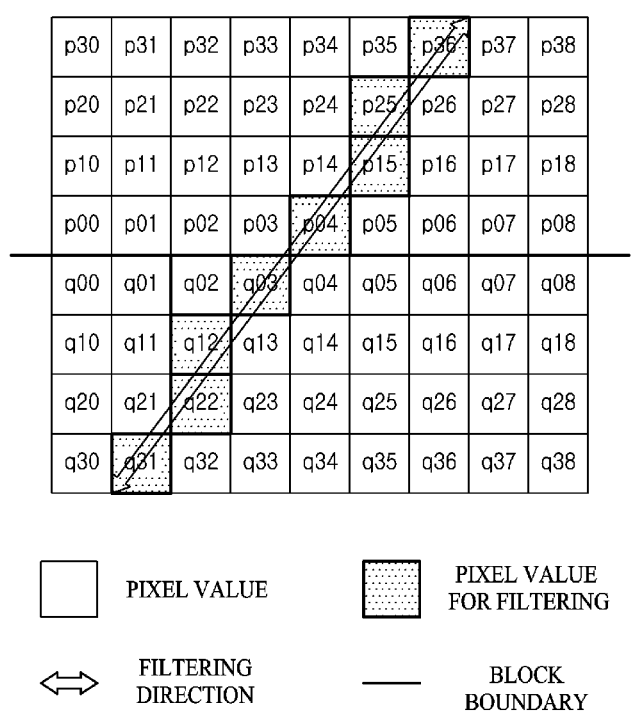

The formula for 56.25 degrees of FIG. 9 is [Condition Formula 7].

$$|p_{04}-q_{03}|<\kappa_{\alpha 3}\alpha;\ |p_{15}-p_{04}|<\kappa_{\beta 3}\beta;\ |q_{12}-q_{03}|<\kappa_{\beta 3}\beta \quad \text{[Condition Formula 7]}$$

Figure 10:
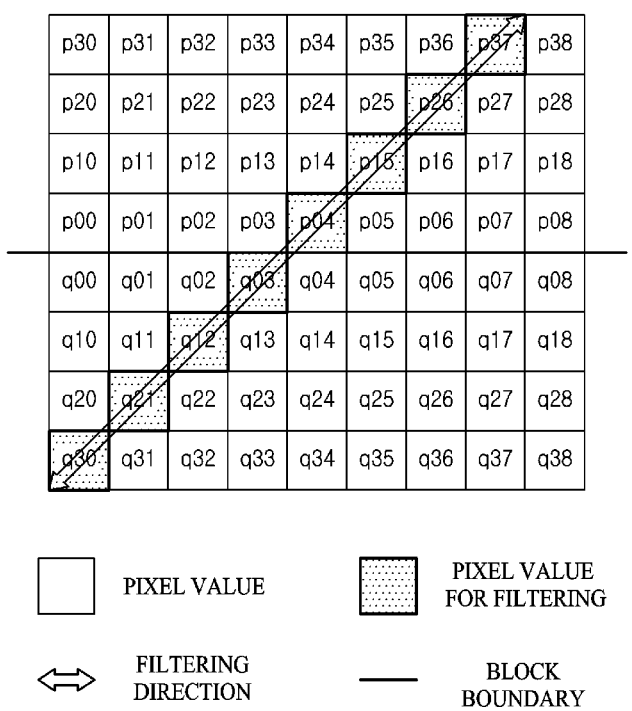

The formula for 45 degrees of FIG. 10 is [Condition Formula 8].

$$|p_{04}-q_{03}|<\kappa_{\alpha 4}\alpha;\ |p_{15}-p_{04}|<\kappa_{\beta 4}\beta;\ |q_{12}-q_{03}|<\kappa_{\beta 4}\beta \quad \text{[Condition Formula 8]}$$

Figure 11:
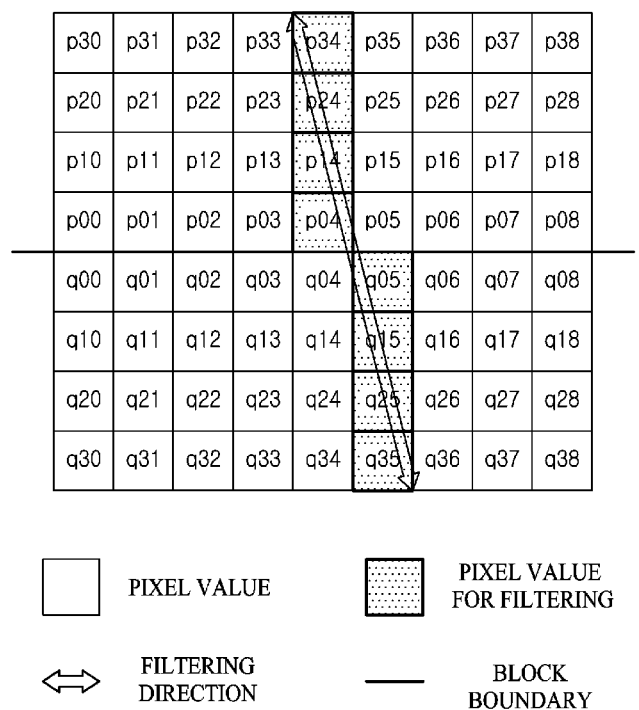

The formula for 101.25 degrees of FIG. 11 is [Condition Formula 9].

$$|p_{04}-q_{03}|<\kappa_{\alpha 2}\alpha;\ |p_{14}-p_{04}|<\kappa_{\beta 2}\beta;\ |q_{13}-q_{03}|<\kappa_{\beta 2}\beta \quad \text{[Condition Formula 9]}$$

Figure 12:
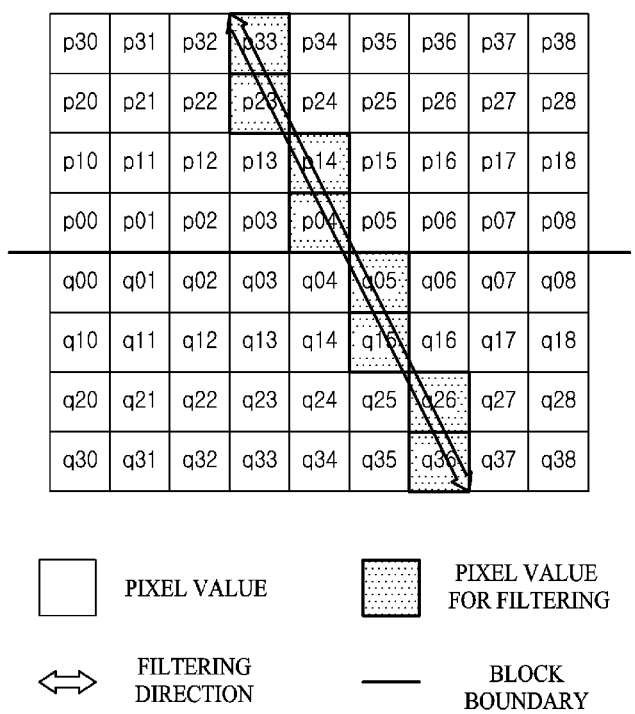

The formula for 112.5 degrees of FIG. 12 is [Condition Formula 10].

$$|p_{04}-q_{05}|<\kappa_{\alpha 6}\alpha;\ |p_{14}-p_{04}|<\kappa_{\beta 6}\beta;\ |q_{15}-q_{05}|<\kappa_{\beta 6}\beta \quad \text{[Condition Formula 10]}$$

Figure 13:
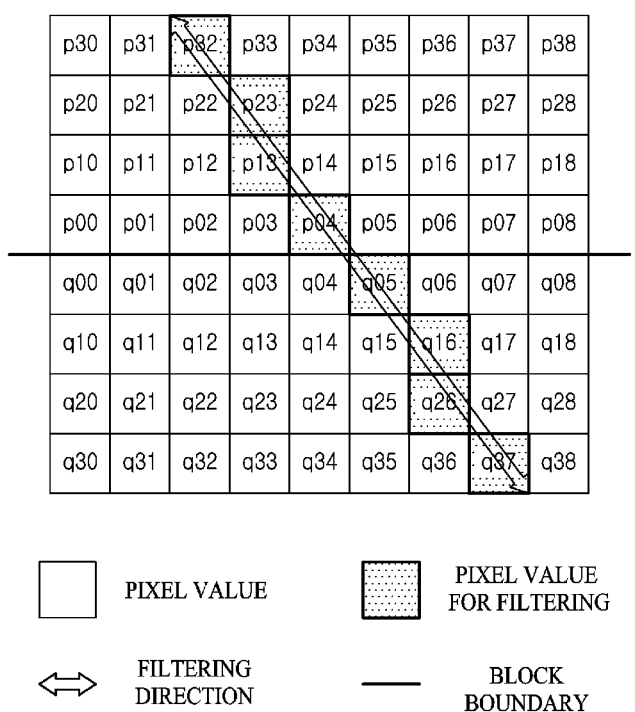

The formula for 123.75 degrees of FIG. 13 is [Condition Formula 11].

$$|p_{04}-q_{05}|<\kappa_{\alpha 7}\alpha;\ |p_{13}-p_{04}|<\kappa_{\beta 7}\beta;\ |q_{16}-q_{05}|<\kappa_{\beta 7}\beta \quad \text{[Condition Formula 11]}$$

Figure 14:
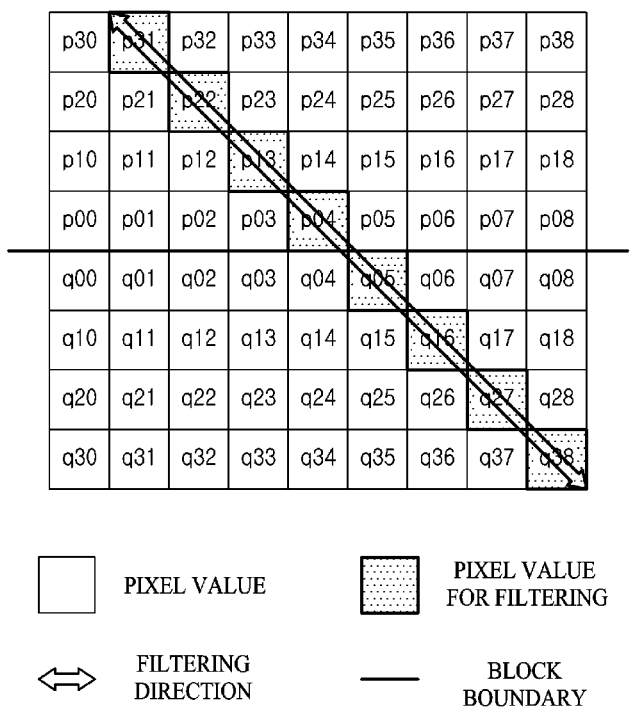

The formula for 135 degrees of FIG. 14 is [Condition Formula 12].

$$|p_{04}-q_{05}|<\kappa_{\alpha 8}\alpha;\ |p_{13}-p_{04}|<\kappa_{\beta 8}\beta;\ |q_{16}-q_{05}|<\kappa_{\beta 8}\beta \quad \text{[Condition Formula 12]}$$

If there are multiple directions selected satisfying the condition formulas from all of the directions shown in FIGS. 6 to 14, filtering unit 199 obtains changes between the pixels on the boundary for the respective selected directions, selects a direction with the smallest pixel value change or multiple directions starting from the ones with smaller changes, and thereby performs the deblocking filtering.

Equations for obtaining changes between pixels for the respective directions in the boundary will follow. ΔBoundary(pixel,direction_set) represents the pixel value changes in a direction set of the boundary pixels. $w_0$ and $w_1$ are constant values for representing the weights which are set to satisfy $0<w_1<w_0<1$ and $w_0+w_1<1$ so that the changes between pixels near the boundaries of the blocks have a larger share than those farther from the boundary in the overall change.

The equations for obtaining the respective directions of the change are specified as follows:

The pixel value changes for the nine directions of 90 degrees, 78.75 degrees, 67.5 degrees, 56.25 degrees, 45 degrees, 101.25 degrees, 112.5 degrees, 123.75 degrees, and 135 degrees shown in FIGS. 6 to 14 are respectively obtained by the following Equations 2 through 10.

$$\Delta\text{Boundary}(p_{04},\text{set}_0)=|p_{04}-q_{04}|+w_0(|p_{14}-p_{04}|+|q_{14}-q_{04}|)+w_1(|p_{24}-p_{14}|+|q_{24}-q_{14}|) \quad \text{[Equation 2]}$$

$$\Delta\text{Boundary}(p_{04},\text{set}_1)=|p_{04}-q_{03}|+w_0(|p_{14}-p_{04}|+|q_{13}-q_{03}|)+w_1(|p_{24}-p_{14}|+|q_{23}-q_{13}|) \quad \text{[Equation 3]}$$

$$\Delta\text{Boundary}(p_{04},\text{set}_3)=|p_{04}-q_{03}|+w_0(|p_{14}-p_{04}|+|q_{13}-q_{03}|)+w_1(|p_{22}-p_{14}|+|q_{22}-q_{13}|) \quad \text{[Equation 4]}$$

$$\Delta\text{Boundary}(p_{04},\text{set}_4)=|p_{04}-q_{03}|+w_0(|p_{15}-p_{04}|+|q_{12}-q_{03}|)+w_1(|p_{26}-p_{15}|+|q_{21}-q_{12}|) \quad \text{[Equation 5]}$$

$$\Delta\text{Boundary}(p_{04},\text{set}_4)=|p_{04}-q_{03}|+w_0(|p_{15}-p_{04}|+|q_{12}-q_{03}|)+w_1(|p_{26}-p_{15}|+|q_{21}-q_{12}|) \quad \text{[Equation 6]}$$

$$\Delta\text{Boundary}(p_{04},\text{set}_5)=|p_{04}-q_{05}|+w_0(|p_{14}-p_{04}|+|q_{15}-q_{05}|)+w_1(|p_{24}-p_{14}|+|q_{25}-q_{15}|) \quad \text{[Equation 7]}$$

$$\Delta\text{Boundary}(p_{04},\text{set}_6)=|p_{04}-q_{05}|+w_0(|p_{14}-p_{04}|+|q_{15}-q_{05}|)+w_1(|p_{23}-p_{14}|+|q_{26}-q_{15}|) \quad \text{[Equation 8]}$$

$$\Delta\text{Boundary}(p_{04},\text{set}_7)=|p_{04}-q_{05}|+w_0(|p_{13}-p_{04}|+|q_{16}-q_{05}|)+w_1(|p_{23}-p_{13}|+|q_{26}-q_{16}|) \quad \text{[Equation 9]}$$

$$\Delta\text{Boundary}(p_{04},\text{set}_1)=|p_{04}-q_{04}|+w_0(|p_{14}-p_{04}|+|q_{14}-q_{04}|)+w_1(|p_{24}-p_{14}|+|q_{24}-q_{14}|) \quad \text{[Equation 10]}$$

The pixels for use in the application of the deblocking filtering for the respective nine directions, that is, the pixels selected by pixel selector 195 are indicated respectively by using bold borders. For example, the pixels used in the direction of 67.5 degrees are p04, p14, p25, p35, q03, q13, q22, and q32.

Figure 20:
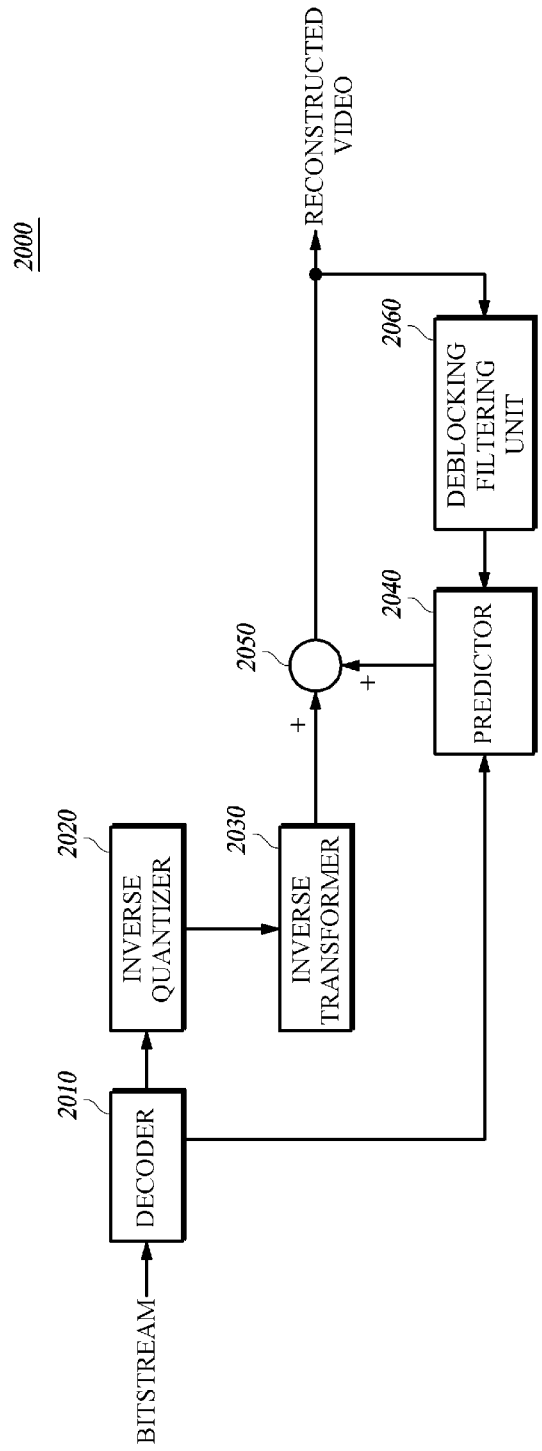
FIG. 20 is a block diagram of a video decoding apparatus according to an aspect.

FIG. 20 is a block diagram of a video decoding apparatus 2000 according to an aspect.

Video decoding apparatus 2000 may include a decoder 2010, an inverse quantizer 2020, an inverse transformer 2030, a predictor 2040, an adder 2050, and a deblocking filtering unit 2060.

Video decoding apparatus 2000 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for decoding videos and related data, and a microprocessor for executing the programs to effect operations and controls.

Decoder 2010 decodes a bitstream to extract a residual block. Specifically, decoder 2010 decodes the bitstream which is the video encoded by video encoding apparatus 100 and extracts the residual block which contains pixel information of the video current block along with a motion vector and rotation information.

Inverse quantizer 2020 inversely quantizes the residual block from decoder 2010. Inverse transformer 2030 inversely transforms the inversely quantized residual signal. Here, the inverse quantization and the inverse transform may be performed in the same way as those described through FIG. 1.

Predictor 2040 for generating a predicted block performs a prediction on the current block by compensating motions including the rotational motion of the current block of an image with the motion vector and rotation information extracted by decoder 2010.

Adder 2050 adds the predicted block from predictor 2040 to the inversely transformed residual signal from inverse transformer 2030 to reconstruct the current block.

Deblocking filtering unit 2060 performs a deblocking filtering with respect to the current block reconstructed by adder 2050, and in particular it selects pixels for filtering by a number of directions preset with reference to the boundary of the current block, decides whether to perform the filtering for corresponding directions depending on relationships between pixel values of selected pixels, and performs the filtering with respect to the selected pixels in the corresponding directions depending on the determination of whether to perform the filtering. Deblocking filtering unit 2060 determines the corresponding directions as the filtering directions if the relationships between pixel values of the pixels selected satisfies a condition that an absolute value of a pixel value difference between two first pixels facing each other with reference to the boundary, an absolute value of a pixel value difference between a second pixel and a first pixel both at one side with reference to the boundary, and an absolute value of a pixel value difference between a second pixel and a first pixel at another side with reference to the boundary are smaller than thresholds respectively preset. If there are multiple filtering directions selected, deblocking filtering unit 2060 may select more than one of the multiple filtering directions in accordance with the pixel value changes between the selected pixels and thereby perform the filtering. Such deblocking filtering unit 2060 is equally constructed to deblocking filtering unit 190 of FIG. 2 for example.

The current blocks reconstructed by adder 2050 are combined by the unit of picture and outputted as a reconstructed image, and the current blocks having been deblocking-filtered by deblocking filtering unit 2060 may be stored as a reference picture to be used by predictor 2040 for predicting the subsequent picture.

Figure 21:
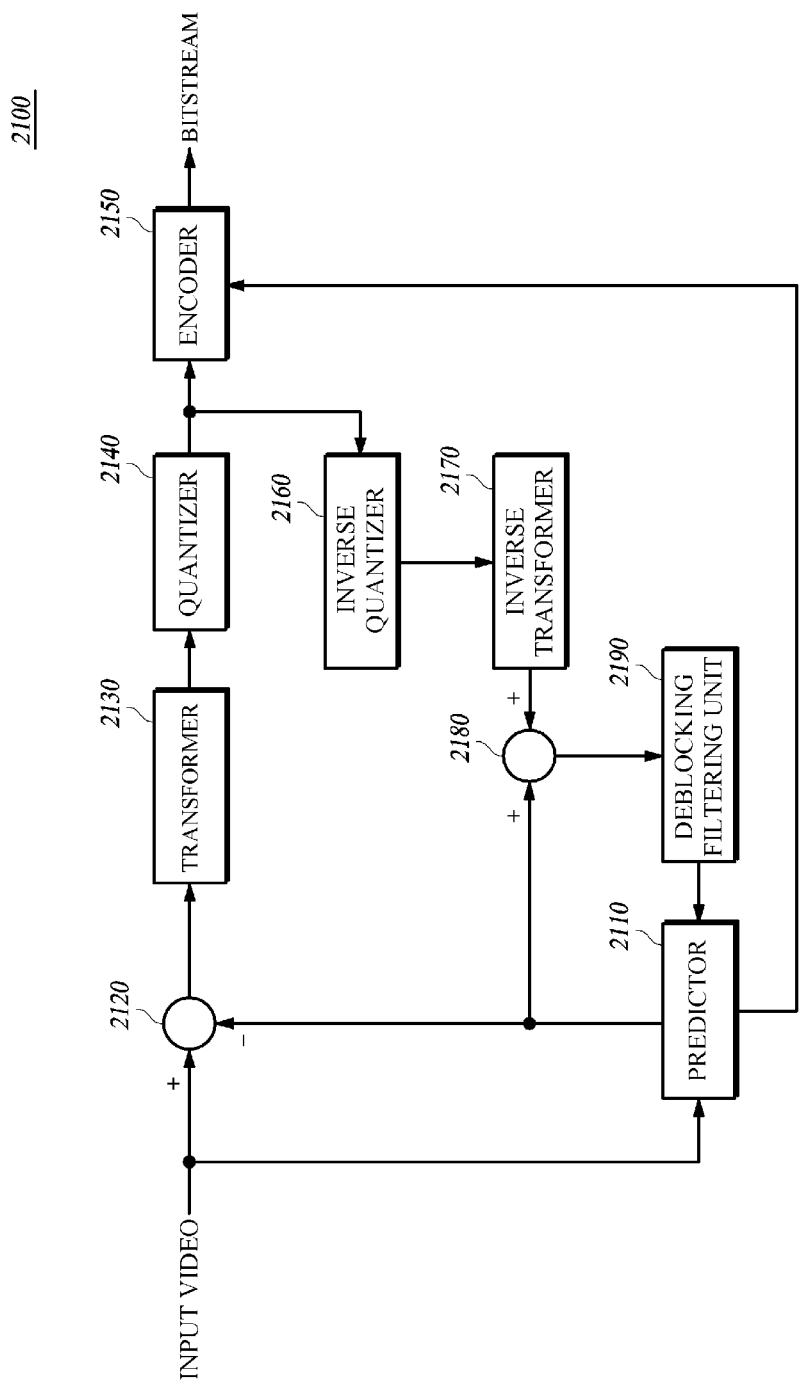
FIG. 21 is a block diagram of a video encoding apparatus according to another aspect.

FIG. 21 is a block diagram of a video encoding apparatus 2100 according to another aspect.

Video encoding apparatus 2100 according to an aspect may comprise a predictor 2110, a subtractor 2120, a transformer 2130, a quantizer 2140, an encoder 2150, an inverse quantizer 2160, an inverse transformer 2170, an adder 2180, and a deblocking filtering unit 2190.

Video encoding apparatus 2100 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, predictor 2110 may predict the current block (or macroblock) by using either one or combined both of the motion prediction-based inter prediction and the intra prediction which predicts a subsequent pixel by taking advantage of the correlations among the pixel signals within a same frame.

For example, predictor 2110 may be formed by two divided sections of a motion estimator (not shown) and a motion compensator (not shown). The motion estimator searches the predicted value of a motion of the current frame macroblock from the reference frame and outputs their motion difference as a motion vector. In other words, the desired macroblock to find is searched for within a predetermined search area of the reference frame to identify the most similar macroblock and its degree of motion is outputted as the motion vector. From the reference frame, the motion compensator gets a predicted macroblock corresponding to the obtained motion vector.

Alternatively, predictor 2110 may be an intra predictor which predicts the current macroblock of the current frame by using macroblocks neighboring the current block, and it predicts the predicted macroblock by calculating predicted pixel values of the respective pixels in the current block using one or more pixel values of one or more adjacent macroblocks. Here, the adjacent macroblocks may be one or more macroblocks which were compressed previously of the current macroblock and are neighboring the current macroblock.

Subtractor 2120 subtracts the predicted macroblock from the current block to generate a residual block. In other words, subtractor 2120 calculates the difference between the original pixel value of each pixel of the current block and the predicted pixel value of each pixel of the predicted block to generate a residual block having residual signals.

Transformer 2130 transforms the residual block into frequency domain. That is, transformer 2130 transforms the residual block into the frequency domain to generate a residual block with frequency coefficients. Here, transformer 2130 in transforming the residual signal may use Hadamard transform, discrete cosine transform (DCT) based transform and various other transform techniques which transform image signals on the time axis to those on the frequency axis, wherein the transformed residual signals into the frequency domain transform are the frequency coefficients.

Quantizer 2140 performs a quantization on the transformed residual block from transformer 2130. That is, quantizer 2140 quantizes the frequency coefficient of the residual block to generate a quantized frequency coefficient. Here, in quantizing the frequency coefficient of the residual block, quantizer 2140 may use a method such as dead zone uniform threshold quantization (DZUTQ), quantization weighted matrix, or their improved quantization methods.

Encoder 2150 encodes the frequency coefficients of the residual block quantized by quantization unit 2140 to generate a bitstream. In addition, upon receiving the motion vector and the rotation information delivered from predictor 2110, encoder 2150 may encode the same together with the quantized frequency coefficients of the residual block to output the bitstream. For this encoding operation, entropy coding technology may be used though not limited thereto and a variety of different coding techniques may be used.

Inverse quantizer 2160 performs an inverse quantization on the quantized residual block from quantizer 2130. In other words, inverse quantizer 2160 inversely quantizes the quantized frequency coefficients of the quantized residual block to generate the frequency coefficients.

Inverse transformer 2170 performs an inverse transform on the inversely quantized residual block from inverse quantizer 2160. In other words, inverse transformer 2170 inversely transforms the inversely quantized frequency coefficients of residual block to reconstruct the residual block having the pixel signals on the time axis.

Adder 2180 adds the predicted block from predictor 2110 to the inversely transformed residual block from inverse transformer 2170 to reconstruct the current block.

Deblocking filtering unit 2190 performs a deblocking filtering with respect to the current block reconstructed by adder 2180. Here, deblocking filtering means a task for reducing a block distortion generated during encoding of an image by the unit of block whereby a deblocking filter may be applied to the block boundary and macroblock boundary together or macroblock boundary only and alternatively the deblocking filter may be omitted. The current block that is reconstructed by adder 2180 and then deblocking-filtered by deblocking filtering unit 2190 in this way may be inputted to predictor 2110 and stored therein as a reference picture for use in predicting the subsequent picture.

Deblocking filtering unit 2190 according to a first aspect of the present disclosure deblocking-filters a current block; and in particular it selects an optimal direction among a number of direction preset respectively for pixels in the boundaries of the subblocks of the current block based on pixel value changes between the pixels corresponding respectively to the directions; and determines the most selected direction among a number of selected optimal directions with respect to all of the pixels in the boundaries of the subblocks, as a filtering direction of a corresponding subblock; selects pixels for filtering based on the determined filtering direction with respect to each of the pixels in the boundaries of the subblocks; determine whether to perform the filtering for the determined filtering direction depending on relationships between pixel values of selected pixels; and performs the filtering with respect to the selected pixels in the determined filtering direction depending on the determination of whether to perform the filtering. Deblocking filtering unit 2190 as above will be described in more detail referring to FIG. 22.

Deblocking filtering unit 2190 according to a second aspect performs a deblocking-filtering on the current block; and in particular it selects a direction as a determined filtering direction among a number of directions preset, with respect to a first pixel in the boundaries of the subblocks of the current block based on pixel value changes between the pixels corresponding respectively to the directions; determines a latest and most selected direction for a current subblock as a determined filtering direction, or determines a direction right ahead of the latest and most selected direction as the determined filtering direction, or determines a filtering direction according to the selecting of the direction of the first pixel, with respect to a second and later ones of the pixels in the boundaries of the subblocks; performs a selection of pixels for filtering based on the determined filtering direction with respect to each of the pixels in the boundaries of the subblocks; determines whether to perform the filtering for the determined filtering direction depending on relationships between pixel values of selected pixels; and performs the filtering with respect to the selected pixels in the determined filtering direction depending on the determination of whether to perform the filtering. Deblocking filtering unit 2190 according to the second aspect will be described in more detail referring to FIG. 23.

Figure 22:
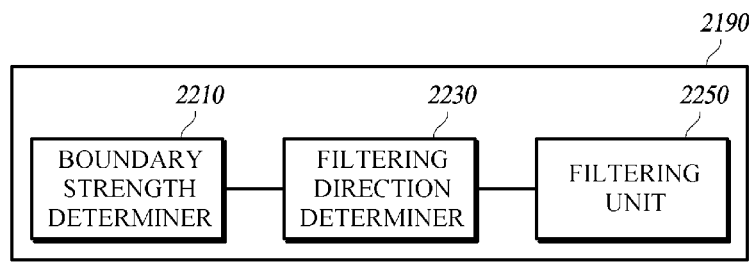
FIG. 22 is a block diagram of an adaptive deblocking filtering apparatus according to a first aspect.

FIG. 22 is a block diagram of the adaptive deblocking filtering apparatus according to the first aspect which corresponds to deblocking filtering unit 2190 of the first aspect in FIG. 21 and is referenced by the same number 2190.

As shown in FIG. 22, deblocking filtering apparatus 2190 of the first aspect includes a boundary strength determiner 2210, a filtering direction determiner 2230, and a filtering unit 2250.

Boundary strength determiner 2210 determines the BS of the boundaries between subblocks of the current block according to the characteristics of the block enclosing pixels at the block boundary at the current location. The BS is valued between 0 and 4 and its determination is specified in the H.264/AVC standard document. That is, boundary strength determiner 2210 determines the BS at the boundary of each block and determines in what strength it would apply the filtering. The BS is valued between 0 and 4 depending on whether the block enclosing the boundary for currently filtering uses the intra prediction encoding method, or depending on the differential distance of the reference block for motion compensation in case of using the inter prediction encoding.

Figure 24:
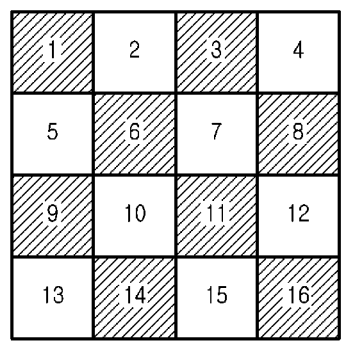
FIG. 24 is a block diagram of a subblock within a macroblock applied to an aspect.

In FIG. 24 showing a 16×16 macroblock made of sixteen 4×4 subblocks numbered 1-16, filtering direction determiner 2230 is adapted to apply the deblocking filtering with respect to number 1, 3, 6, 8, 9, 11, 14, and 16 subblocks; and for the respective pixels (their boundaries) (1-16 in FIG. 26) entitled to the deblocking filtering and located in the boundaries (①②③④ in FIGS. 25 and 26) of the corresponding subblocks, filtering direction determiner 2230 selects an optimal direction among a number of directions (see FIG. 27) preset with reference to the block boundaries based on pixel value changes between the pixels (see FIGS. 28 through 36) corresponding respectively to the directions, and determines the most selected direction among a number of selected optimal directions with respect to all of the pixels (their boundaries) in the boundaries of the subblocks, as a determined filtering direction of the corresponding subblock. In other words, filtering direction determiner 2230 presets the nine filtering directions of 45 degrees, 56.25 degrees, 67.5 degrees, 78.75 degrees, 90 degrees, 101.25 degrees, 112.5 degrees, 123.75 degrees, and 135 degrees with reference to the horizontal or vertical boundary as shown in FIG. 27, selects the pixels corresponding respectively to the nine directions as shown in FIGS. 25 through 33, obtains the pixel value changes between the pixels corresponding to the respective directions, selects among the directions one with the smallest pixel value change as an optimal direction, repeats the selection of optimal direction for all of the pixels (their boundaries) in the boundaries of the subblocks, and then determines the most selected direction among a number of selected optimal directions with respect to all of the pixels (their boundaries) in the boundaries of the subblocks, as the filtering direction of the corresponding subblock. Filtering direction determiner 2230 in an example may record such determined filtering direction as additional information for the corresponding subblock and may alternatively have the pixels through the filtering in the determined filtering direction among the pixels in the boundaries of corresponding subblocks assigned with an additional single bit of information and recorded. Such additional information is supplied for use by a decoding apparatus which will be described hereinafter.

Figure 29:
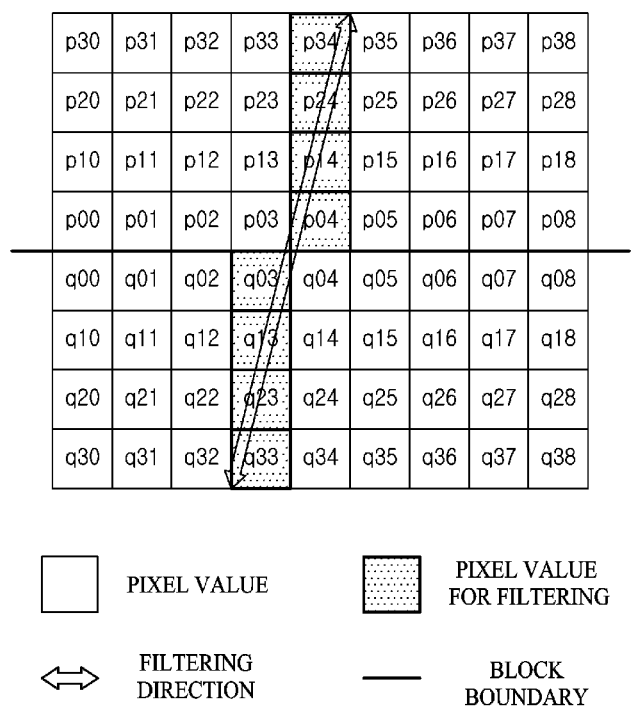

Referring to an example of FIG. 29, filtering direction determiner 2230 may calculate the pixel value changes based on an absolute value of a pixel value difference ($p04-q03$) between two first pixels ($p04$, $q03$) facing each other with reference to a corresponding boundary, an absolute value of a pixel value difference ($p14-p04$) between a second pixel ($p14$) and a first pixel ($p04$) both at one side with reference to the corresponding boundary, an absolute value of a pixel value difference ($q13-q03$) between a second pixel ($q13$) and a first pixel ($q03$) at the other side with reference to the corresponding boundary, an absolute value of a pixel value difference ($p24-p14$) between a third pixel ($p24$) and the second pixel ($p14$) at the one side with reference to the corresponding boundary, and an absolute value of a pixel value difference ($q23-q13$) between a third pixel (q23) and the second pixel (q13) at the another side with reference to the corresponding boundary. A specific example of the method for calculating the pixel value changes will be described.

Filtering unit 2250 selects pixels for filtering based on the determined filtering direction by filtering direction determiner 2230 with respect to each of the pixels (their boundaries) in the boundaries of the subblocks as shown in FIGS. 28 through 36, determines whether to perform the filtering for the determined filtering direction depending on relationships between pixel values of selected pixels, and performs the filtering with respect to the selected pixels in the determined filtering direction depending on the determination of whether to perform the filtering as shown in FIGS. 28 through 36.

In a case where the determined filtering direction by filtering direction determiner 2230 is 78.75 degrees as in FIG. 29, filtering unit 2250 may perform the filtering in the same determined filtering direction of 78.75 degrees by the filtering direction determiner if the relationships between pixel values of the selected pixels due to the determined 78.75-degree filtering direction satisfies a condition that an absolute value of a pixel value difference (p04−q03) between two first pixels (p04, q03) facing each other with reference to a corresponding boundary is smaller than its preset threshold (α, β), an absolute value of a pixel value difference (p14−p04) between a second pixel (p14) and a first pixel (p04) both at one side with reference to the corresponding boundary is smaller than its preset threshold (α, β), and an absolute value of a pixel value difference (q13−q03) between a second pixel (q13) and a first pixel (q03) at the other side with reference to the corresponding boundary is smaller than its preset threshold (α, β), but if the above condition is not satisfied by the relationships between pixel values of the selected pixels due to the 78.75-degree determined filtering direction of FIG. 29, the filtering unit may check if vertical direction of the corresponding boundary can satisfy the same, and in accordance with a result of the check, perform the filtering. A specific example of the determining condition on whether to perform the filtering will follow.

Figure 23:
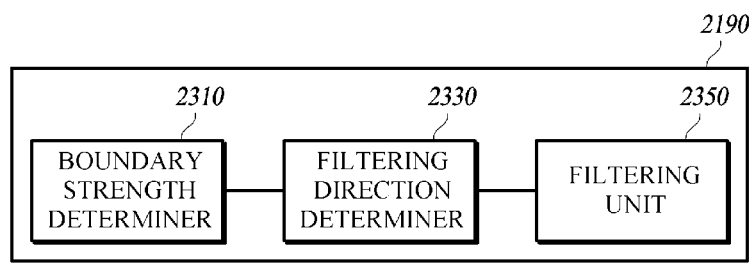
FIG. 23 is a block diagram of a deblocking filtering apparatus according to a second aspect.

FIG. 23 is a block diagram of a deblocking filtering apparatus according to a second aspect which corresponds to deblocking filtering apparatus 2190 of the first aspect in FIG. 22 and is referenced by the same number 2190.

As shown in FIG. 23, deblocking filtering unit 2190 of the second aspect includes a boundary strength determiner 2310, a filtering direction determiner 2330, and a filtering unit 2350.

Boundary strength determiner 2310 determines the BS of the boundaries between subblocks of the current block according to the characteristics of the block enclosing pixels at the block boundary at the current location. The BS is valued between 0 and 4 and its determination is specified in the H.264/AVC standard document. That is, boundary strength determiner 2310 determines the BS at the boundary of each block and determines with what strength it would apply the filtering. The BS is valued between 0 and 4 depending on whether the block enclosing the boundary for currently filtering uses the intra prediction encoding method, or depending on the differential distance of the reference block for motion compensation in case of using the inter prediction encoding.

Figure 25:
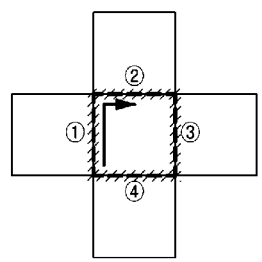
FIG. 25 is a block diagram of boundaries of subblocks applied to an aspect.
Figure 26:
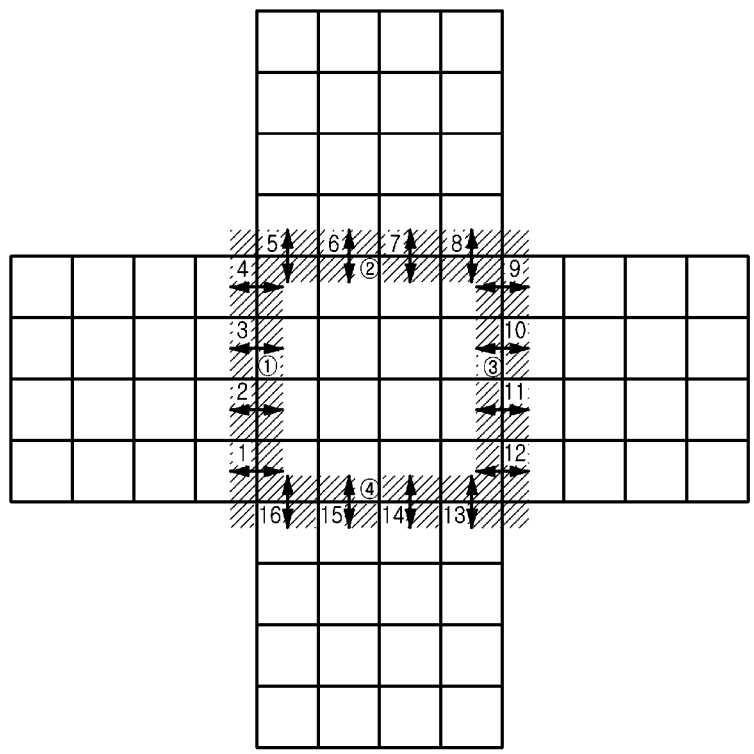
FIG. 26 is a block diagram of pixel boundaries in the boundaries of subblocks applied to an aspect.
Figure 27:
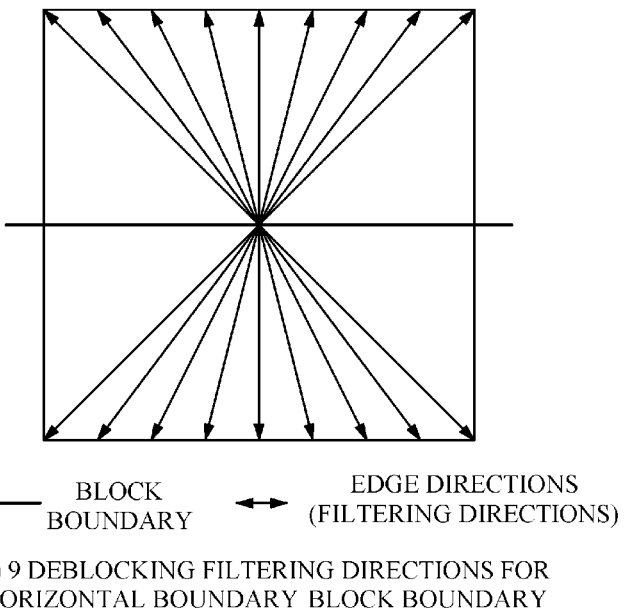
FIG. 27 is a diagram of exemplary filtering directions according to an aspect.
Figure 27:
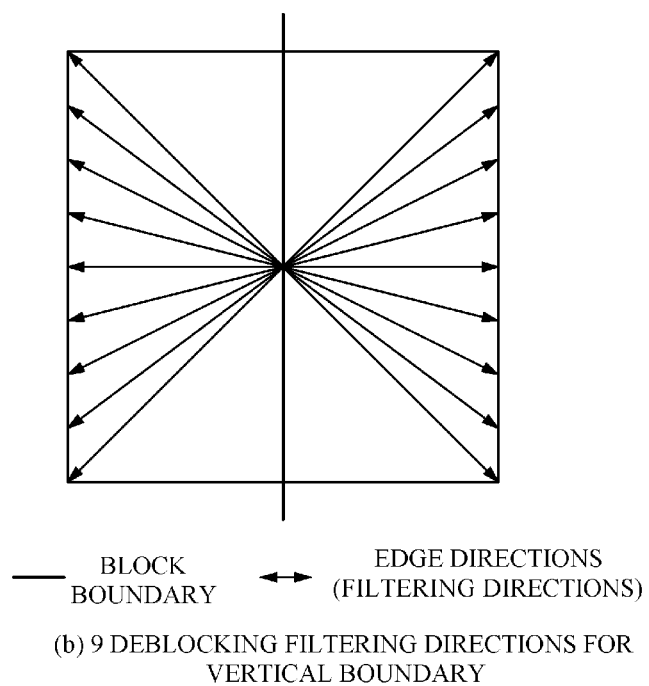

In FIG. 24 showing the 16×16 macroblock made of sixteen 4×4 subblocks numbered 1-16, filtering direction determiner 2330 is adapted to apply the deblocking filtering with respect to number 1, 3, 6, 8, 9, 11, 14, and 16 subblocks; and for a first pixel (its boundary) ('1' in FIG. 26) entitled to the deblocking filtering and located in the boundaries (①② ③ ④) in FIGS. 25 and 26) of the subblocks, filtering direction determiner 2330 may select a direction as a determined filtering direction based on pixel value changes between the pixels corresponding respectively to the directions among a number of directions preset; and for a second and later pixels (their boundaries) ('2-16' in FIG. 26) of the pixels in the boundaries of the corresponding subblocks, filtering direction determiner 2330 may determine a latest and most selected direction for a current subblock as a determined filtering direction, or determine a direction right ahead of the latest and most selected direction as the determined filtering direction, or determine a filtering direction according to the selecting of the direction of the first pixel.

Referring to an example of FIG. 29, filtering direction determiner 2330 may calculate the pixel value changes based on an absolute value of a pixel value difference (p04−q03) between two first pixels (p04, q03) facing each other with reference to a corresponding boundary, an absolute value of a pixel value difference (p14−p04) between a second pixel (p14) and a first pixel (p04) both at one side with reference to the corresponding boundary, an absolute value of a pixel value difference (q13−q03) between a second pixel (q13) and a first pixel (q03) at the other side with reference to the corresponding boundary, an absolute value of a pixel value difference (p24−p14) between a third pixel (p24) and the second pixel (p14) at the one side with reference to the corresponding boundary, and an absolute value of a pixel value difference (q23−q13) between a third pixel (q23) and the second pixel (q13) at the other side with reference to the corresponding boundary. A specific example of the method for calculating the pixel value changes will follow.

Filtering unit 2350 selects pixels for filtering based on the determined filtering direction by filtering direction determiner 2330 with respect to each of the pixels (their boundaries) in the boundaries of the corresponding subblocks as shown in FIGS. 28 through 36, determines whether to perform the filtering for the determined filtering direction depending on relationships between pixel values of selected pixels, and performs the filtering with respect to the selected pixels and in response to the determined filtering direction depending on the determination of whether to perform the filtering as shown in FIGS. 28 through 36.

In a case where the determined filtering direction by filtering direction determiner 2330 is 78.75 degrees as in FIG. 29, filtering unit 2350 may perform the filtering in the same determined filtering direction of 78.75 degrees by the filtering direction determiner if the relationships between pixel values of the selected pixels due to the determined 78.75-degree filtering direction satisfies a condition that an absolute value of a pixel value difference (p04−q03) between two first pixels (p04, q03) facing each other with reference to a corresponding boundary, an absolute value of a pixel value difference (p14−p04) between a second pixel (p14) and a first pixel (p04) both at one side with reference to the corresponding boundary, and an absolute value of a pixel value difference (q13−q03) between a second pixel (q13) and a first pixel (q03) at the other side with reference to the corresponding boundary are smaller than thresholds (α, β) respectively preset. A specific example of the determining condition on whether to perform the filtering will follow.

Figure 37:
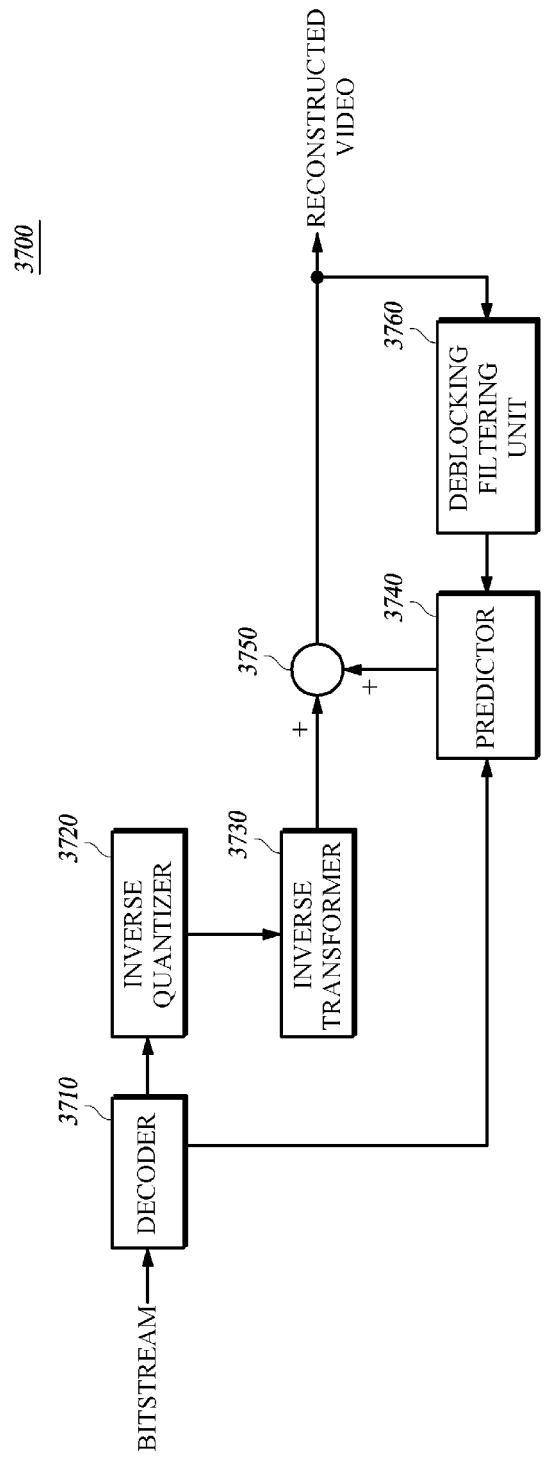
FIG. 37 is a block diagram of a video decoding apparatus according to an aspect.

FIG. 37 is a block diagram of a video decoding apparatus 3700 according to an aspect.

Video decoding apparatus 3700 may include a decoder 3710, an inverse quantizer 3720, an inverse transformer 3730, a predictor 3740, an adder 3750, and a deblocking filtering unit 3760.

Video decoding apparatus 3700 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for decoding videos and related data, and a microprocessor for executing the programs to effect operations and controls.

Decoder 3710 decodes a bitstream to extract a residual block. Specifically, decoder 3710 decodes the bitstream which is the video encoded by video encoding apparatus 2100 and extracts the residual block which contains pixel information of the video current block along with a motion vector and rotation information.

Inverse quantizer 3720 inversely quantizes the residual block from decoder 3710. Inverse transformer 3730 inversely transforms the inversely quantized residual signal. Here, the inverse quantization and the inverse transform may be performed in the same way as those described through FIG. 21.

Predictor 3740 for generating a predicted block performs a prediction on the current block by compensating motions including the rotational motion of the current block of an image with the motion vector and rotation information extracted by decoder 3710.

Adder 3750 adds the predicted block from predictor 3740 to the inversely transformed residual signal from inverse transformer 3730 to reconstruct the current block.

Deblocking filtering unit 3760 performs a deblocking filtering with respect to the current block reconstructed by adder 3750.

In performing the deblocking filtering the current block, deblocking filtering unit 3760 of this aspect selects a determined optimal direction among a number of directions preset, with respect to a particular pixel corresponding to additional information received, for example, from decoding apparatus 2100 of FIG. 21 among all of pixels in the boundaries of the subblocks of the current block based on pixel value changes between the pixels corresponding respectively to the directions which are preset, determines the optimal direction as a determined filtering direction of the corresponding subblock, selects pixels for filtering based on the determined filtering direction with respect to each of the pixels in the boundaries of the subblocks, determines whether to perform the filtering for the determined filtering direction depending on the relationships between the pixel values of the selected pixels, and performing the filtering with respect to the selected pixels in the determined filtering direction depending on the determination of whether to perform the filtering. As described, the aspect of deblocking filtering unit 3760 may be constructed to have the same functions as the aspect of deblocking filtering unit 2190 of FIG. 21 or the aspect of deblocking filtering apparatus 2190 of FIG. 22 except that unit 3760 does not determine the optimal directions for all of the pixels of the subblock boundaries but does the same just for the single pixel corresponding to the additional information received from decoding apparatus 2100 of FIG. 21.

In performing the deblocking filtering the current block, deblocking filtering unit 3760 according to a second aspect selects pixels for filtering based on a filtering direction received as additional information of a corresponding subblock, with respect to each of the pixels in the boundaries of the subblocks of the current block in particular; determines whether to perform the filtering for the determined filtering direction depending on relationships between pixel values of selected pixels; and performs the filtering with respect to the selected pixels in the determined filtering direction depending on the determination of whether to perform the filtering. As described, the second aspect of deblocking filtering unit 3760 may be constructed to have the same functions as the first aspect of deblocking filtering unit 2190 of FIG. 21 or the first aspect of deblocking filtering apparatus 2190 of FIG. 22 except that unit 3760 omits the step of determining the filtering direction for the corresponding subblock and use the filtering direction in the form of the additional information as received from decoding apparatus 2100 of FIG. 21.

In performing the deblocking filtering the current block, deblocking filtering unit 3760 according to a third aspect selects a direction as a determined filtering direction among a number of directions preset, with respect to a first pixel in the boundaries of the subblocks of the current block in particular, based on pixel value changes between the pixels corresponding respectively to the preset multiple directions; with respect to a second and later ones of the pixels in the boundaries of the subblocks, deblocking filtering unit 3760 determines a latest and most selected direction for the current subblock as a determined filtering direction, or determines a direction right ahead of the latest and most selected direction as the determined filtering direction, or determines a filtering direction according to the selecting process of the direction of the first pixel; and deblocking filtering unit 3760 selects the pixels for filtering based on the determined filtering direction with respect to each of the pixels in the boundaries of the subblocks; determines whether to perform the filtering for the determined filtering direction depending on relationships between pixel values of selected pixels; and performs the filtering with respect to the selected pixels in the determined filtering direction depending on the determination of whether to perform the filtering. As described, the fourth aspect of deblocking filtering unit 3760 may be constructed to have the same functions as the second aspect of deblocking filtering unit 2190 of FIG. 21 or the second aspect of deblocking filtering apparatus 2190 of FIG. 23.

The current blocks reconstructed by adder 3750 may be combined by the unit of picture and outputted as a reconstructed image, and the current blocks having been deblocking-filtered by deblocking filtering unit 3760 may be stored as a reference picture to be used by predictor 2040 for predicting the subsequent picture.

The following descriptions are about the operation of the apparatus according to the disclosure and a deblocking method applicable to the apparatus.

As applied to the present description, the deblocking filtering method of H.264 ("Advanced video coding for generic audiovisual services", Draft, ITU-T Recommendation H.264, March, 2005, p. 182~p. 194) will be briefed.

Figure 38:
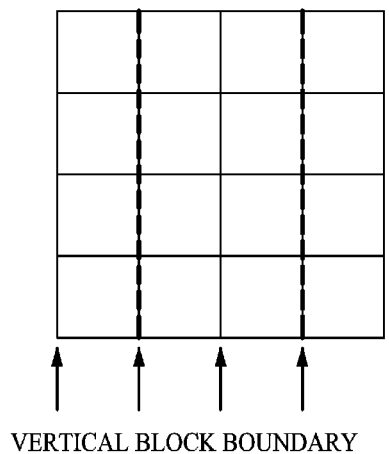
FIGS. 38 to 39 are diagrams of a vertical boundary and a horizontal boundary of a macroblock, respectively.
Figure 39:
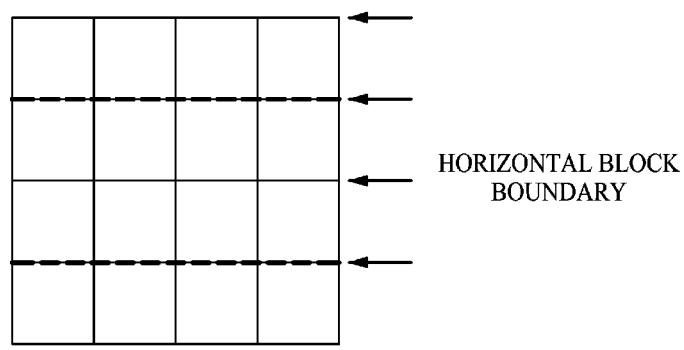

The deblocking filtering method of H.264, with reference to a boundary of a unit 4×4 block for DCT and quantization, first takes a vertical filtering as in FIG. 38, and then takes a horizontal filtering as in FIG. 39.

Figure 40:
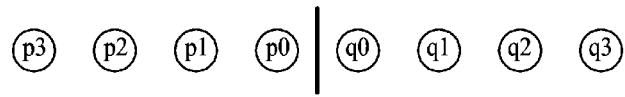
FIG. 40 is a diagram of exemplary pixels for a horizontal filtering and a vertical filtering in the cases of a vertical and a horizontal block boundaries.
Figure 40:
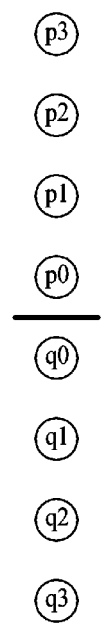

Before applying the deblocking filter, considering a block made of pixels p0~p3 and a block of pixels q0~q3 as in FIG. 40, a determination is made on the boundary strength BS for the boundary of each block and on what strength of filtering is to be applied depending on each BS. The value of BS is determined between 0 and 4 depending on whether the block enclosing the boundary for currently filtering uses the intra prediction encoding method, or depending on the differential distance of the reference block for motion compensation in case of using the inter prediction encoding.

Upon determining the BS, a determination is made on whether to perform the filtering by determining whether the pixels at the boundaries between the respective blocks are a distorted boundary or an existing edge in the actual image. Using the following Equation 11 and upon its dissatisfaction, H.264 recognizes the existing edge in the actual image and holds a filtering, but with a satisfaction of the Equation it concludes the boundary is distorted by a blocking artifact and performs the deblocking filtering.

$$BS>0$$

$$|p_0-q_0|<\alpha; |p_1-p_0|<\beta; |q_1-q_0|<\beta \quad \text{[Equation 11]}$$

Here, $\alpha$, $\beta$ are values determined adaptively by a quantization parameter and mean threshold values to help determine if the current boundary is either a pixel difference from a blocking artifact or the result of an actual edge. In the case of a larger quantization level causing a greater scale of the blocking artifact, the threshold is supposed to be set greater.

Once it is determined whether to perform the filtering, a low-band filterer is used according to the strength value of the block boundary for a smoothing process with respect to pixels across the boundary. An exemplary calculation method for the filtering may be same as described in H.264 ("Advanced video coding for generic audiovisual services", Draft, ITU-T Recommendation H.264, March, 2005, p. 182~p. 194).

As stated above, H.264 deblocking filter determines the filter strength by the encoding properties of the blocks, applies Equation 11 to the block boundary to determine the presence of an edge for adaptively performing the deblocking filtering for the respective boundaries while preserving the best of the edge component, whereby reducing the blocking artifacts. However, this limited deblocking filtering in the horizontal and vertical directions cannot correct the distortion from the blocking artifacts caused by a diagonal discontinuity.

Figure 41:
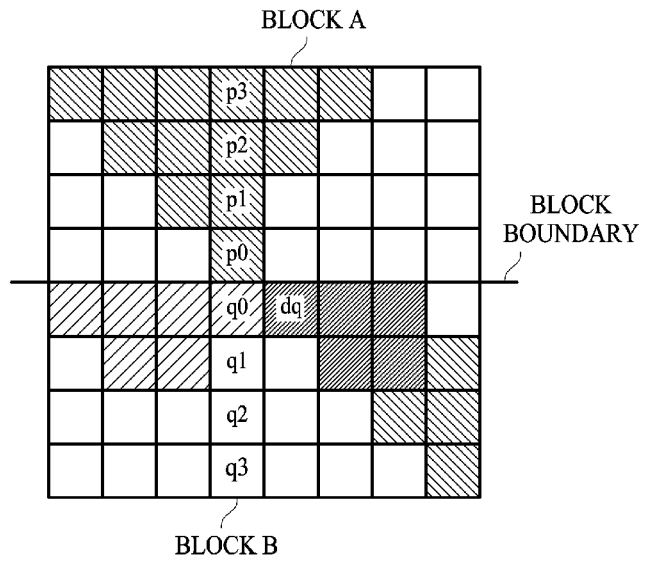
FIG. 41 is diagrams of a diagonal edge assumed to be present and illustrated at (a) with a vertical filtering and (b) with a diagonal filtering.
Figure 41:
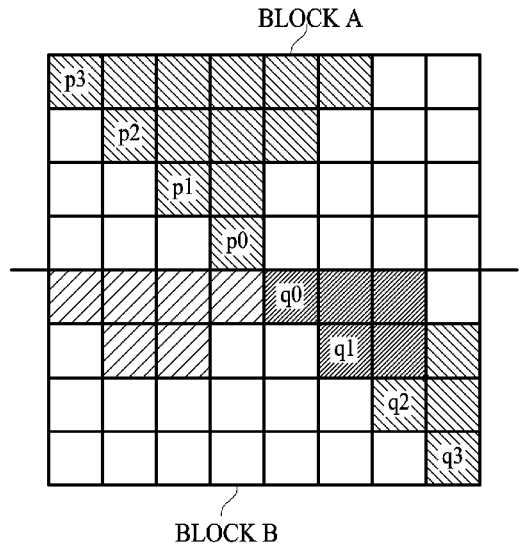

To be more specific, when performing the deblocking filtering only in the conventional horizontal and vertical directions and in the case of FIG. 41 at (a) where the block boundary contains a diagonal edge component, Equation 11 as applied to the boundary made of pixels p0~p3 and pixels q0~q3 will not be satisfied with an edge determined to hold the filtering. However, if block A and block B have the block strength valued 1 or more, it is visible that the blocking artifact causes diagonal discontinuity of pixel values notwithstanding pixels p0 and dq0 are equally valued pixels. Therefore, to solve the blocking artifact due to the diagonal discontinuity of pixel values, it is necessary to perform the deblocking filtering not only in the vertical and horizontal directions but also in the diagonal direct adaptively. To be further specific, if a low-band filtering is applied to the boundary diagonally as in FIG. 41 at (b), the pixel values of p0 and q0 will change similar towards each other and become smooth to resolve the distortions due to the discontinuity of pixel values at the block boundary.

Therefore, the aspects of the disclosure allow performing the deblocking filtering in other directions than the vertical and horizontal directions.

Especially, considering an operation of the deblocking filtering with directivity by the unit of pixel, the aspects of the present disclosure provide a method with less computation volume that is capable of assuming the deblocking filtering by the unit of pixel with respect to a diverse of edge directions.

According to a deblocking filtering method of a first aspect which is applicable to the apparatus of FIG. 22, an encoder performs the deblocking filtering by checking the edge directions for the respective pixels, determines the most selected filtering direction therefrom, and generates and transmits very little information thereof which is then received and used by a decoder for performing the deblocking filtering with directivity. Generally, since the edge directions in the 4×4 subblocks of a video are mostly consistent, it is reasonable to perform the deblocking filtering with respect to just one or two directions instead of all directions. This method causes no changes in the computation volume of the encoder but offers a huge reduction of the computation volume in decoders.

Figure 42:
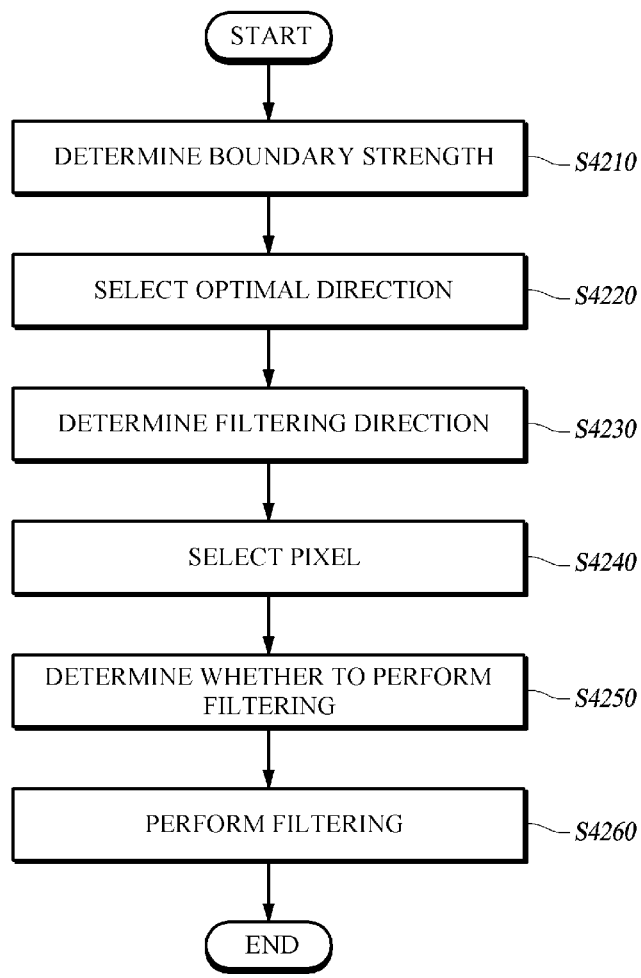
FIG. 42 is a flow diagram of a deblocking filtering method according to a first aspect.

FIG. 42 is a flow diagram of a deblocking filtering method according to a first aspect which is applicable to the deblocking filtering apparatus of FIG. 22 and will be described together with its operation.

As illustrated, this aspect of deblocking filtering method includes steps of: determining strength of boundaries between subblocks of a current block in S4210; selecting an optimal direction among a number of directions preset respectively for pixels in the boundaries of the subblocks based on pixel value changes between the pixels corresponding respectively to the directions in S4220; determining a most selected direction among a number of selected optimal directions with respect to all of the pixels in the boundaries of the subblocks, as a determined filtering direction of a corresponding subblock in S4230; performing a selection of pixels for filtering based on the determined filtering direction with respect to each of the pixels in the boundaries of the subblocks in S4240; performing a determination of whether to perform the filtering for the determined filtering direction depending on relationships between pixel values of selected pixels in S4250; and performing the filtering with respect to the selected pixels in the determined filtering direction depending on the determination of whether to perform the filtering in S4260.

The deblocking filtering method according to the first aspect is more detailed as follows.

FIG. 24 shows the 16×16 macroblock having 4×4 subblocks numbered 1-16 of which alternating Nos. 1, 3, 6, 8, 9, 11, 14, and 16 subblocks are subject to the application of this aspect of the present disclosure.

As shown in FIG. 25, the deblocking filtering is applied to four boundaries at ①, ②, ③, and ④ of the corresponding subblock that is entitled to the application of the deblocking filtering. In the following specific example, steps 1 though 11 address the process carried out in the encoder and the steps 11 to 13 are performed in the decoders.

Step 1: Boundary strength determiner 2210 determines the BS of the respective boundaries of each block in S4310.

Step 2: If BS is 0, no deblocking filtering is assumed but if it is 1~4 the condition formula is checked to determine whether to perform the deblocking filtering.

Step 3: With respect to pixel boundaries at Nos. 1-16 of the 4×4 subblock boundaries ①, ②, ③, and ④, filtering direction determiner 2230 determines the optimal deblocking filtering direction among the nine preset directions in FIG. 27 in S4220.

Step 4: To obtain the optimal direction, filtering direction determiner 2230 calculates the pixel value changes between the pixels corresponding to the nine preset directions on the respective Nos. 1-16 pixel boundaries, and selects the direction with a smallest pixel value change among the nine directions as the edge direction that is the optimal direction for assuming the deblocking filtering in S4220.

Step 5: Equations for filtering direction determiner 2230 to obtain changes between pixels for the respective nine directions on the boundaries will follow. $\Delta$Boundary(pixel, direction_set) represents the pixel value changes between pixels in a direction set selected from the respective directions with reference to the pixel of the pixel boundary. $w_0$ and $w_1$ are constant values for representing the weights which are set to satisfy $0 < w_1 < w_0 < 1$ and $w_0 + w_1 < 1$ so that the changes between pixels near the boundaries between the blocks have a larger share than those farther from the boundary in the overall change in S4220.

Figure 28:
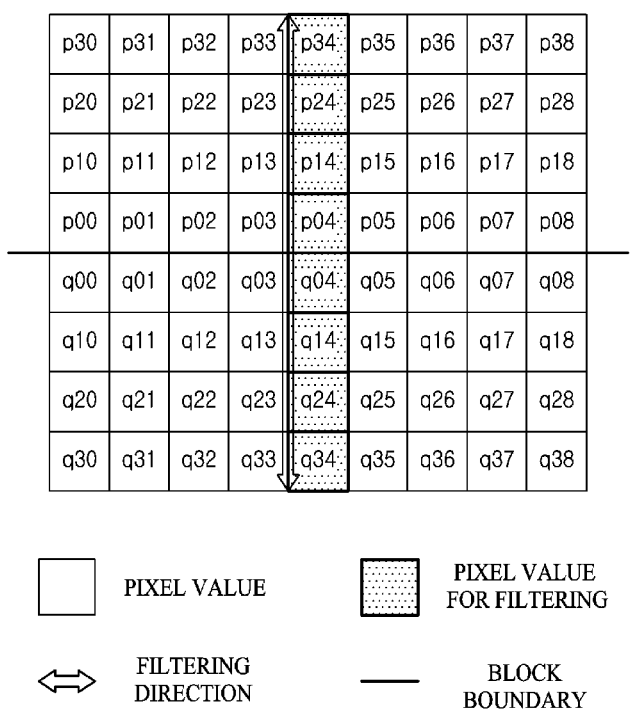
FIGS. 28 to 36 are diagrams for illustrating pixels selected by the filtering directions of FIG. 27.

Step 6: The equations for filtering direction determiner 2230 to obtain the respective nine directions of the change are specified as follows in S4220:

The pixel value change for the direction of 90 degrees shown in FIG. 28 is obtained by Equation 12.

$$\Delta\text{Boundary}(p_{04}, \text{set}_0) = |p_{04} - q_{04}| + w_0(|p_{14} - p_{04}| + |q_{14} - q_{04}|) + w_1(|p_{24} - p_{14}| + |q_{24} - q_{14}|) \quad \text{[Equation 12]}$$

The pixel value change for the direction of 78.75 degrees shown in FIG. 29 is obtained by Equation 13.

$$\Delta\text{Boundary}(p_{04}, \text{set}_1) = |p_{04} - q_{03}| + w_0(|p_{14} - p_{04}| + |q_{13} - q_{03}|) + w_1(|p_{24} - p_{14}| + |q_{23} - q_{13}|) \quad \text{[Equation 13]}$$

Figure 30:
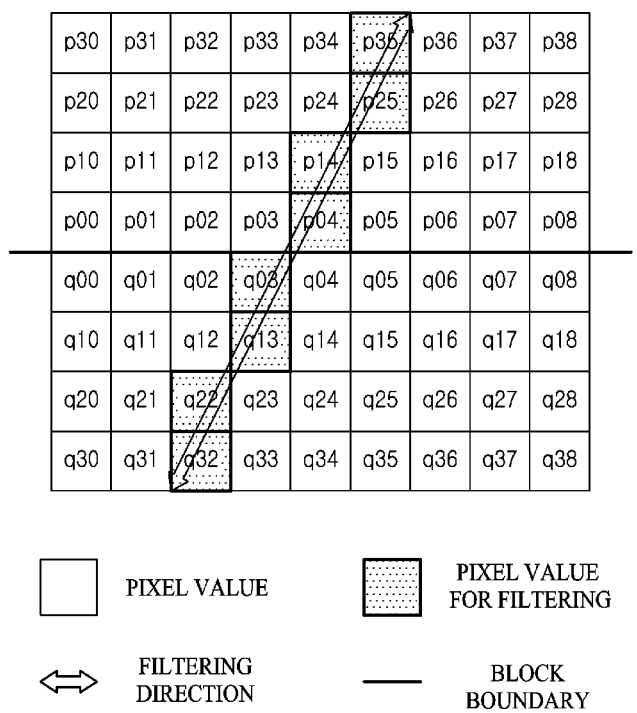

The pixel value change for the direction of 67.5 degrees shown in FIG. 30 is obtained by Equation 14.

$$\Delta\text{Boundary}(p_{04}, \text{set}_2) = |p_{04} - q_{03}| + w_0(|p_{14} - p_{04}| + |q_{13} - q_{03}|) + w_1(|p_{25} - p_{14}| + |q_{22} - q_{13}|) \quad \text{[Equation 14]}$$

Figure 31:
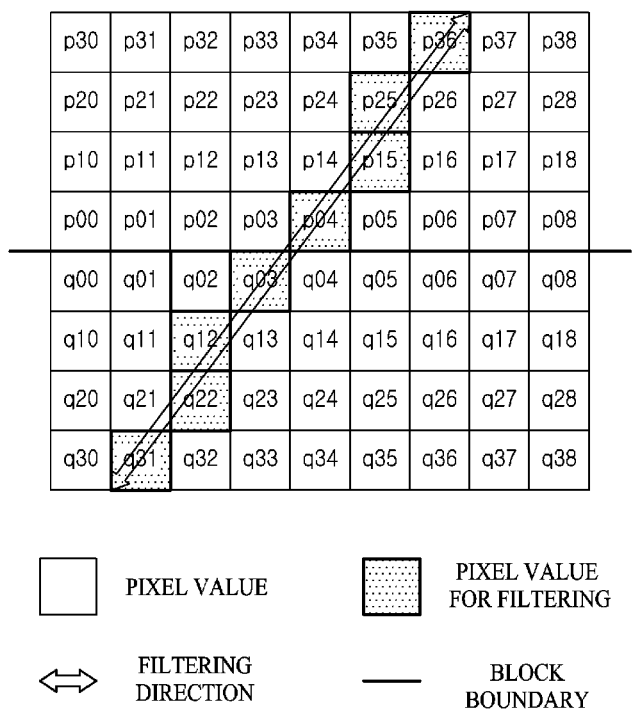

The pixel value change for the direction of 56.25 degrees shown in FIG. 31 is obtained by Equation 15.

$$\Delta\text{Boundary}(p_{04}, \text{set}_3) = |p_{04} - q_{03}| + w_0(|p_{14} - p_{04}| + |q_{12} - q_{03}|) + w_1(|p_{25} - p_{15}| + |q_{22} - q_{12}|) \quad \text{[Equation 15]}$$

Figure 32:
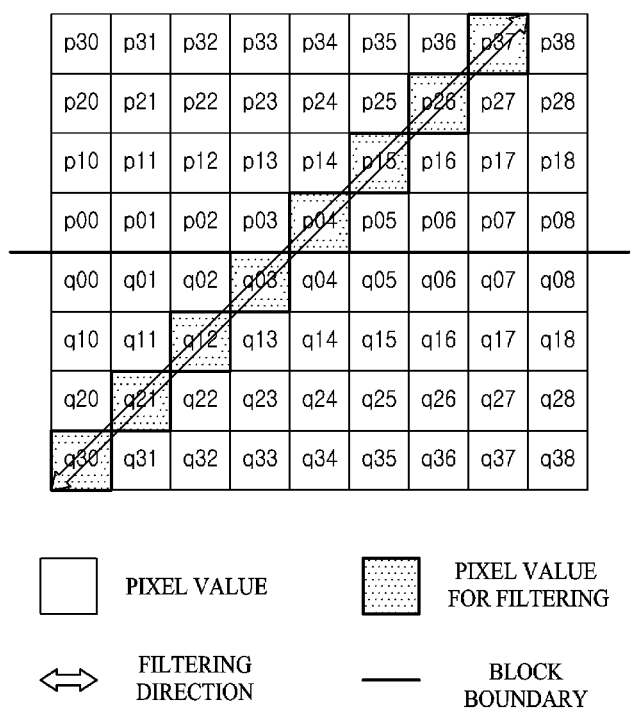

The pixel value change for the direction of 45 degrees shown in FIG. 32 is obtained by Equation 16.

$$\Delta\text{Boundary}(p_{04}, \text{set}_4) = |p_{04} - q_{03}| + w_0(|p_{15} - p_{04}| + |q_{12} - q_{03}|) + w_1(|p_{26} - p_{15}| + |q_{21} - q_{12}|) \quad \text{[Equation 16]}$$

Figure 33:
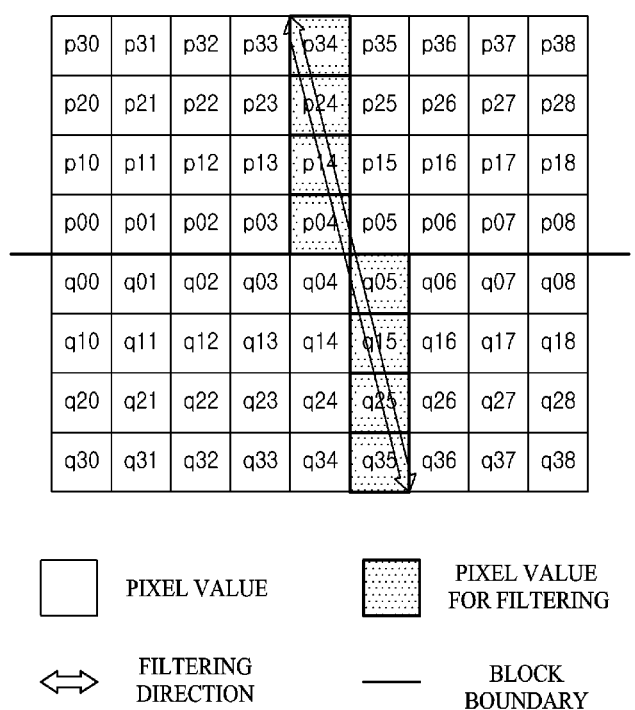

The pixel value change for the direction of 101.25 degrees shown in FIG. 33 is obtained by Equation 17.

$$\Delta\text{Boundary}(p_{04}, \text{set}_5) = |p_{04} - q_{05}| + w_0(|p_{14} - p_{04}| + |q_{15} - q_{05}|) + w_1(|p_{24} - p_{14}| + |q_{25} - q_{15}|) \quad \text{[Equation 17]}$$

Figure 34:
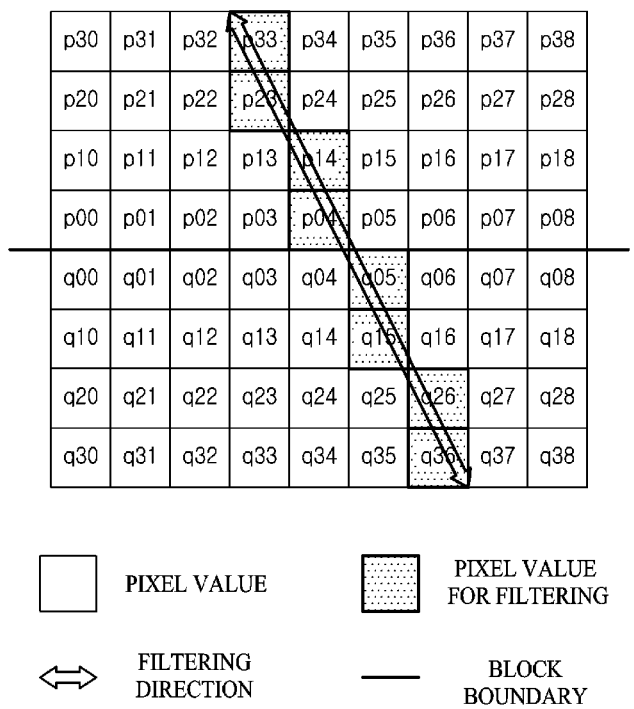

The pixel value change for the direction of 112.5 degrees shown in FIG. 34 is obtained by Equation 18.

$$\Delta\text{Boundary}(p_{04}, \text{set}_6) = |p_{04} - q_{05}| + w_0(|p_{14} - p_{04}| + |q_{15} - q_{05}|) + w_1(|p_{23} - p_{14}| + |q_{26} - q_{15}|) \quad \text{[Equation 18]}$$

Figure 35:
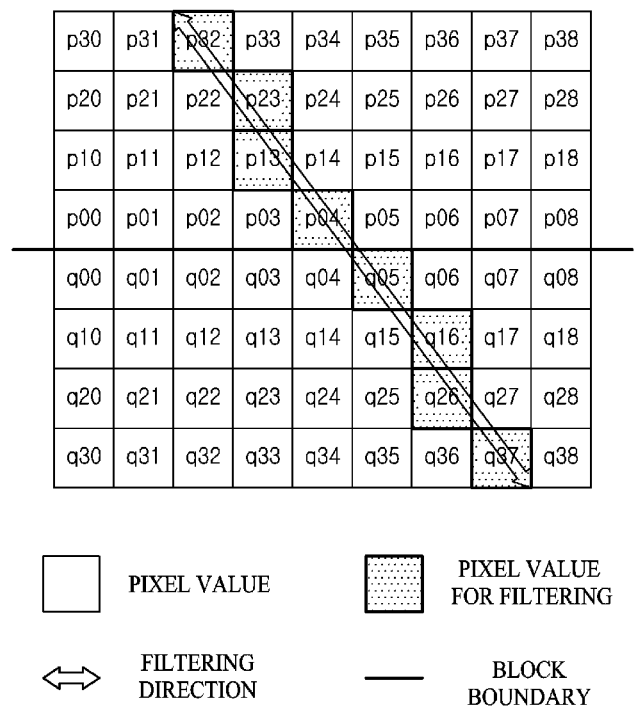

The pixel value change for the direction of 123.75 degrees shown in FIG. 35 is obtained by Equation 19.

$$\Delta\text{Boundary}(p_{04}, \text{set}_7) = |p_{04} - q_{05}| + w_0(|p_{13} - p_{04}| + |q_{16} - q_{05}|) + w_1(|p_{23} - p_{13}| + |q_{26} - q_{16}|) \quad \text{[Equation 19]}$$

Figure 36:
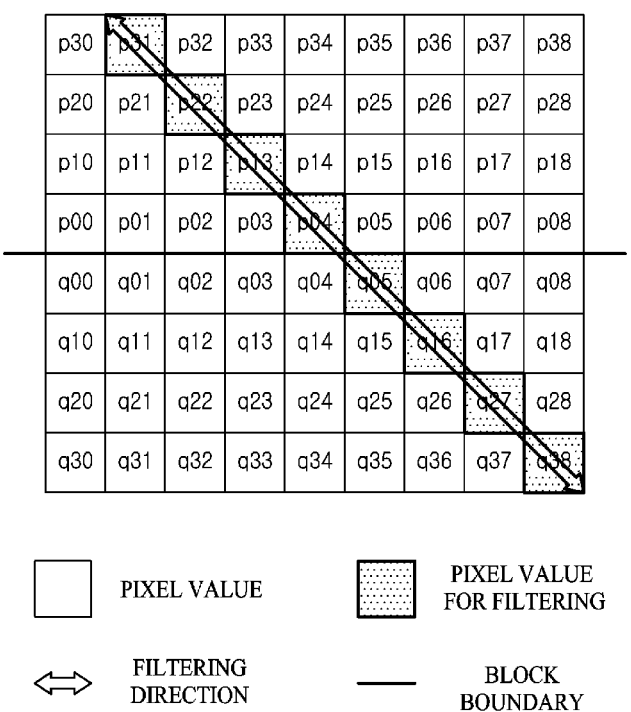

The pixel value change for the direction of 135 degrees shown in FIG. 36 is obtained by Equation 20.

$$\Delta\text{Boundary}(p_{04}, \text{set}_8) = |p_{04} - q_{05}| + w_0(|p_{13} - p_{04}| + |q_{16} - q_{05}|) + w_1(|p_{22} - p_{13}| + |q_{27} - q_{16}|) \quad \text{[Equation 20]}$$

Step 7: Next, filtering direction determiner 2230 determines the most selected optimal direction among the Nos. 1-16 pixel boundaries in FIG. 26 in as the deblocking filtering direction of the corresponding subblock in S4230.

Step 8: Then, filtering unit 2250 determines whether to perform the deblocking filtering in the determined filtering direction as above for the respective boundaries between Nos. 1-16 pixels. This is when condition formulas similar to [Equation 11] are used, and in this example of using nine different preset filtering directions, the determination of whether to perform the deblocking filter is made through a separate condition formula for each of the nine directions, and a satisfaction of the condition formula allows performing the deblocking filtering in the corresponding filtering direction. In an occasion that the determined filtering direction cannot satisfy the condition formula, the formula is applied to the vertical direction of the boundary to see it is satisfied, and if yes, the deblocking filtering is performed in the vertical direction of the boundary in S4240~S4260.

Step 9: The pixels needed for the operation to apply the condition formulas in the respective nine directions are as shown in FIGS. 28 through 36 in S4230. The particular condition formulas for the respective directions in will follow. Here, $\kappa_{\alpha x}$ and $\kappa_{\beta x}$ are constant values which can control the threshold to adjust the level of performing the deblocking filtering in the respective directions.

The formula for 90 degrees of FIG. 28 is [Condition Formula 13].

$$|p_{04} - q_{04}| < \alpha; \quad |p_{14} - p_{04}| < \beta; \quad |q_{14} - q_{04}| < \beta \quad \text{[Condition Formula 13]}$$

The formula for 78.75 degrees of FIG. 29 is [Condition Formula 14].

$$|p_{04} - q_{03}| < \kappa_{\alpha 1}\alpha; \quad |p_{14} - p_{04}| < \kappa_{\beta 1}\beta; \quad |q_{13} - q_{03}| < \kappa_{\beta 1}\beta \quad \text{[Condition Formula 14]}$$

The formula for 67.5 degrees of FIG. 30 is [Condition Formula 15].

$$|p_{04} - q_{03}| < \kappa_{\alpha 2}\alpha; \quad |p_{14} - p_{04}| < \kappa_{\beta 2}\beta; \quad |q_{13} - q_{03}| < \kappa_{\beta 2}\beta \quad \text{[Condition Formula 15]}$$

The formula for 56.25 degrees of FIG. 31 is [Condition Formula 16].

$$|p_{04} - q_{03}| < \kappa_{\alpha 3}\alpha; \quad |p_{15} - p_{04}| < \kappa_{\beta 3}\beta; \quad |q_{12} - q_{03}| < \kappa_{\beta 3}\beta \quad \text{[Condition Formula 16]}$$

The formula for 45 degrees of FIG. 32 is [Condition Formula 17].

$$|p_{04} - q_{03}| < \kappa_{\alpha 4}\alpha; \quad |p_{15} - p_{04}| < \kappa_{\beta 4}\beta; \quad |q_{12} - q_{03}| < \kappa_{\beta 4}\beta \quad \text{[Condition Formula 17]}$$

The formula for 101.25 degrees of FIG. 33 is [Condition Formula 18].

$$|p_{04} - q_{05}| < \kappa_{\alpha 5}\alpha; \quad |p_{14} - p_{04}| < \kappa_{\beta 5}\beta; \quad |q_{15} - q_{05}| < \kappa_{\beta 5}\beta \quad \text{[Condition Formula 18]}$$

The formula for 112.5 degrees of FIG. 34 is [Condition Formula 19].

$$|p_{04} - q_{05}| < \kappa_{\alpha 6}\alpha; \quad |p_{14} - p_{04}| < \kappa_{\beta 6}\beta; \quad |p14 - p04| < \kappa\beta 6\beta \quad \text{[Condition Formula 19]}$$

The formula for 123.75 degrees of FIG. 35 is [Condition Formula 20].

$$|p_{04} - q_{05}| < \kappa_{\alpha 7}\alpha; \quad |p_{13} - p_{04}| < \kappa_{\beta 7}\beta; \quad |q_{16} - q_{05}| < \kappa_{\beta 7}\beta \quad \text{[Condition Formula 20]}$$

The formula for 135 degrees of FIG. 36 is [Condition Formula 21].

$$|p_{04} - q_{05}| < \kappa_{\alpha 8}\alpha; \quad |p_{13} - p_{04}| < \kappa_{\beta 8}\beta; \quad |q_{16} - q_{05}| < \kappa_{\beta 8}\beta \quad \text{[Condition Formula 21]}$$

Step 10: Meanwhile, one pixel is selected from pixels filtered in the deblocking filtering direction (the deblocking filtering direction determined in step 7) of a corresponding sub-block other than the vertical direction, additional information of 1 bit is allocated to the selected pixel, and the additional information is then transmitted to a decoder. For another example, the deblocking filtering direction (the deblocking filtering direction determined in step 7) of a corresponding sub-block is recorded and stored as additional information, and this additional information may be transmitted from an encoder to the decoder.

Step 11: By using the additional information received from the encoder, the decoder selects a pixel at a location appointed by the encoder. Further, by using the same method as the method used by the encoder, the decoder finds the direction in which the deblocking of the pixel is to be performed. This direction serves as the deblocking filtering direction of a corresponding 4×4 sub-block (which is set as the same as the filtering direction found in step 7).

Step 12: When the filtering direction of the corresponding sub-block has been determined, likewise the encoder, the decoder also performs the same process as steps 8 and 9, thereby performing the deblocking filtering.

Step 13: By applying the method described above, the decoder need not determine, differently from the encoder, the direction to perform the deblocking filtering for every pixel, and can determine the direction for only one pixel, determine the determined direction as the main direction of the current sub-block, and then performing the deblocking filtering, which may decrease the quantity of operation. However, the encoder should a small amount of additional information to the decoder.

Figure 43:
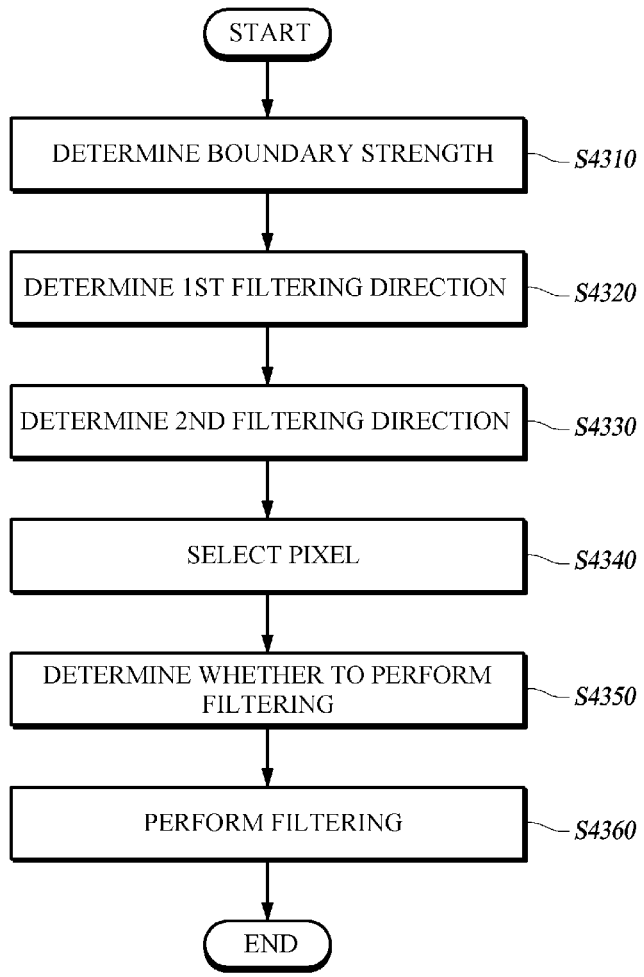
FIG. 43 is a flow diagram of a deblocking filtering method according to a second aspect.

FIG. 43 is a flowchart illustrating a deblocking filtering method according to the second aspect of the present disclosure, which may be applied to the apparatus shown in FIG. 23 and will be described now together with the operation of the apparatus.

As noted from FIG. 43, the deblocking filtering method according to the second aspect of the present disclosure includes: determining strength of boundaries between sub-blocks of a current block (step S4310); selecting a direction as a first determined filtering direction among a number of directions preset, with respect to a first pixel in the boundaries of the subblocks based on pixel value changes between the pixels corresponding respectively to the directions (step S4320); determining a latest and most selected direction for a current subblock as a second determined filtering direction, or determining a direction right ahead of the latest and most selected direction as an optimal filtering direction, or determining a filtering direction according to the selecting of the direction of the first pixel, with respect to a second and later ones of the pixels in the boundaries of the subblocks (step S4330); performing a selection of pixels for filtering based on the determined filtering direction with respect to each of the pixels in the boundaries of the subblocks (step S4340); performing a determination of whether to perform the filtering for the determined filtering direction depending on relationships between pixel values of selected pixels (step S4350); and performing the filtering with respect to the selected pixels in the determined filtering direction depending on the determination of whether to perform the filtering (step S4360).

Now, the deblocking filtering method according to the second aspect of the present disclosure will be described in more detail.

The deblocking filtering method according to the second aspect of the present disclosure corresponds to a method of performing a deblocking filtering by the unit of pixel while reducing the quantity of operation in comparison with the conventional method, without the necessity to transmit additional information from an encoder to a decoder.

FIG. 24 illustrates a macro block including 16×16 pixels, wherein the deblocking filtering according to the present disclosure is applied to the alternating 4×4 sub-blocks of Nos. 1, 3, 6, 8, 9, 11, 14, and 16 among the 4×4 sub-blocks of Nos. 1 to 16. Referring to FIG. 25, the deblocking filtering is applied to four boundary surfaces of, and of the corresponding sub-block to which the deblocking filtering is to be applied. The following is a more detailed discussion.

Step 1: The boundary strength determiner 2310 determines the block boundary strength (BS) with respect to each boundary in S4310.

Step 2: When BS is 0, the boundary strength determiner 2310 does not perform the deblocking filtering. When BS is 1~4, the boundary strength determiner 2310 checks the condition formula, so as to determine whether to perform the deblocking filtering.

Step 3: The filtering direction determiner 2330 determines the direction to apply the deblocking filtering among the preset 9 directions with respect to the boundary surface of the corresponding sub-block of FIG. 26. As in the deblocking filtering method according to the first aspect of the present disclosure shown in FIG. 42, after obtaining the pixel value change between pixels with respect to each of the preset 9 directions, the filtering direction determiner 2330 determines the direction having the least change as the first filtering direction. In obtaining the pixel value change between pixels with respect to each of the preset 9 directions, the filtering direction determiner 2330 uses Equations 12 to 20 (step S4320). Then, the filtering unit 2350 checks the condition formulas corresponding to the determined first filtering direction (see condition formulas 1 to 9 of step 9 of the first aspect shown in FIG. 42), performs the deblocking filtering in the first filtering direction when the condition formulas are satisfied, and does not perform the deblocking filtering when the condition formulas are not satisfied (steps S4340 to S4360).

Step 4: Next, in the No. 2 pixel boundary of the boundary surface of FIG. 26, the filtering direction determiner 2330 determines the first filtering direction used at the No. 1 pixel boundary as the filtering direction, and the filtering unit 2350 determines whether to perform the deblocking filtering in the determined filtering direction (steps S4330 to S4350). In this event, the filtering unit 2350 uses a corresponding condition formula among the condition formulas 1 to 9 of step 9 according to the first aspect. When the condition formula is satisfied, the filtering unit 2350 performs the deblocking filtering (step S4360). When the condition formula is not satisfied, the filtering direction determiner 2330 checks the 9 directions again as in the No. 1 pixel boundary and determines the direction having the least change as the filtering direction (step S4330), and the filtering unit 2350 performs the deblocking filtering (steps S4340 to S4360).

Step 5: Next, in the No. 3 pixel boundary of the boundary surface of FIG. 26, the filtering direction determiner 2330 determines the filtering direction, which has been selected by the largest number of times up to the present, as the filtering direction, and the filtering unit 2350 determines whether to perform the deblocking filtering by applying a corresponding condition formula among the condition formulas 1 to 9 with respect to the determined filtering direction (steps S4330 to S4350). When the condition formula is satisfied, the filtering unit 2350 performs the deblocking filtering (step S4360). When the condition formula is not satisfied, the filtering direction determiner 2330 determines the filtering direction (the filtering direction of the No. 2 pixel boundary surface), which has been just previously used, as the filtering direction, and the filtering unit 2350 determines whether to perform the deblocking filtering by applying the corresponding condition formula to the determined filtering direction (steps S4330 to S4350). Then, when the condition formula is satisfied, the filtering unit

2350 performs the deblocking filtering (step S4360). When the condition formula is not satisfied again, the filtering direction determiner 2330 checks the 9 directions again as in the above process with respect to the No. 1 pixel boundary and determines the direction having the least change as the filtering direction (step S4330), and the filtering unit 2350 performs the deblocking filtering (steps S4340 to S4360).

Step 6: As described above, with respect to the No. 2 or higher pixel boundary in each pixel boundary of the 4×4 sub-block, first, it is determined whether to apply the deblocking filtering by using the direction having been selected by the largest number of times up to the present in the sub-block, and the filtering is then performed in that direction. Second, when the condition is not satisfied, it is determined whether to apply the deblocking filtering to the direction having been just previously used with respect to the pixel boundary, and the filtering is then performed in that direction. Then, when the second solution is not satiable, either, the change with respect to each direction is obtained to determine the direction of the deblocking filtering and perform the filtering.

According to the second aspect of the present disclosure, it is possible to first check only the direction having the highest possibility with respect to each boundary of each pixel within a 4×4 sub-block. Further, as a result of the checking, when the condition is satisfied, it is unnecessary to check the other directions, which can reduce the quantity of operation.

The above disclosed aspects of the adaptive deblocking filtering method based on intra-prediction directions may be implemented by a computer readable code on a computer readable recording medium. The computer readable media may comprise any kinds of recording devices for recording data readable by computer systems. Examples of such computer readable recording media include ROM, RAM, CD-ROM, magnetic tapes, floppy discs, and optical data storages, and further comprise an implementation in carrier waves (e.g. transmission over the Internet). In addition, the computer readable recording media may be provided in a distributed processing system where computer systems are networked to store and execute computer readable codes at distributed locations.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes.

Accordingly, the scope of the disclosure is not to be limited by the above aspects but by the claims and the equivalents thereof.

INDUSTRIAL APPLICABILITY

As described above, the present disclosure is highly useful for application to video encoding/decoding techniques for applying the deblocking filter in diverse directions beyond the vertical and horizontal directions in units of a pixel to effectively remove block distortion phenomena due to diagonal discontinuity by multiple diagonal edges, whereby improving the resultant picture quality and dramatically reducing the computation volume in removing the block distortion phenomena.

The invention claimed is:

1. A deblocking filtering apparatus comprising a microprocessor configured to:
   determine a boundary among four boundaries corresponding to four sides of a current block, the determined boundary being located between the current block and a neighboring block adjacent to the current block;
   determine a plurality of corresponding filtering directions for boundary pixels along and in the determined boundary of the current block by selecting, per each boundary pixel of the boundary pixels, each of the plurality of corresponding filtering directions from among a plurality of candidate directions based on each pixel value difference between relating pixels positioned, with respect to said each boundary pixel, in every direction of the plurality of candidate directions;
   determine a filtering direction for the boundary of the current block, by selecting the determined filtering direction mostly selected from among the plurality of the determined corresponding filtering directions for said each boundary pixel of the boundary pixels, wherein each of the plurality of the determined corresponding filtering directions corresponds to said each corresponding filtering direction for said each boundary pixel of the boundary pixels;
   select pixels for filtering based on the determined filtering direction with respect to said each boundary pixel of the boundary pixels;
   determine whether to perform the filtering for the determined filtering direction depending on a first condition on a relationship between pixel values of the selected pixels for filtering, with respect to said each boundary pixel of the boundary pixels; and
   perform the filtering with respect to the selected pixels for filtering in the determined filtering direction, depending on the determination of whether to perform the filtering, the filtering being performed, for all the boundary pixels, in the same determined filtering direction,
   wherein said each pixel value difference is calculated corresponding to said each boundary pixel of the boundary pixels.

2. The deblocking filtering apparatus of claim 1, wherein the microprocessor is configured to
calculate said each pixel value difference based on
(i) an absolute value of a pixel value difference between two first pixels, of the relating pixels, facing each other with reference to the boundary,
(ii) an absolute value of a pixel value difference between a second pixel and a first pixel, of the relating pixels, both at one side with reference to the boundary,
(iii) an absolute value of a pixel value difference between a second pixel and a first pixel, of the relating pixels, at another side with reference to the boundary,
(iv) an absolute value of a pixel value difference between a third pixel and the second pixel, of the relating pixels, at the one side with reference to the boundary, and
(v) an absolute value of a pixel value difference between a third pixel and the second pixel, of the relating pixels, at the another side with reference to the boundary, and
select, among the plurality of candidate directions, a candidate direction with a smallest pixel value difference as said each corresponding filtering direction.

3. The deblocking filtering apparatus of claim 1, wherein the microprocessor is configured to perform the filtering in the determined filtering direction when the relationships between pixel values of the selected pixels satisfy the first condition that
(i) an absolute value of a pixel value difference between two first pixels, of the selected pixels, facing each other with reference to the boundary,
(ii) an absolute value of a pixel value difference between a second pixel and a first pixel, of the selected pixels, both at one side with reference to the boundary, and
(iii) an absolute value of a pixel value difference between a second pixel and a first pixel, of the selected pixels, at another side with reference to the boundary
are smaller than thresholds respectively preset.

4. The deblocking filtering apparatus of claim 1, wherein when the determined filtering direction does not satisfy the first condition, the microprocessor is configured to
perform a check if a vertical direction of the boundary satisfies a second condition on a relationship between pixel values of the selected pixels for filtering with respect to the vertical direction, and
perform a filtering with respect to a vertical direction according to the check.

5. The deblocking filtering apparatus of claim 1, wherein the plurality of candidate directions include 45 degrees, 56.25 degrees, 67.5 degrees, 78.75 degrees, 90 degrees, 101.25 degrees, 112.5 degrees, 123.75 degrees, and 135 degrees with respect to a horizontal direction.

6. A deblocking filtering method comprising:
determining a boundary among four boundaries corresponding to four sides of a current block, the determined boundary being located between the current block and a neighboring block adjacent to the current block;
determining a plurality of corresponding filtering directions for boundary pixels along and in the determined boundary of the current block by selecting, per each boundary pixel of the boundary pixels, each of the plurality of corresponding filtering directions from among a plurality of candidate directions based on each pixel value difference between relating pixels positioned, with respect to said each boundary pixel, in every direction of the plurality of candidate directions;
determining a filtering direction for the boundary of the current block, by selecting the determined filtering direction mostly selected from among the plurality of the determined corresponding filtering directions for said each boundary pixel of the boundary pixels, wherein each of the plurality of the determined corresponding filtering directions corresponds to said each corresponding filtering direction for said each boundary pixel of the boundary pixels;
selecting pixels for filtering based on the determined filtering direction, with respect to said each boundary pixel of the boundary pixels;
determining whether to perform the filtering for the determined filtering direction depending on a first condition on a relationship between pixel values of the selected pixels for filtering, with respect to said each boundary pixel of the boundary pixels; and
performing the filtering with respect to the selected pixels for filtering in the determined filtering direction depending on the determination of whether to perform the filtering, the filtering being performed, for all the boundary pixels, in the same determined filtering direction,
wherein said each pixel value difference is calculated corresponding to said each boundary pixel of the boundary pixels.

7. The deblocking filtering method of claim 6, wherein the selecting the direction includes
calculating said each pixel value difference based on
(i) an absolute value of a pixel value difference between two first pixels, of the relating pixels, facing each other with reference to the boundary,
(ii) an absolute value of a pixel value difference between a second pixel and a first pixel, of the relating pixels, both at one side with reference to the boundary,
(iii) an absolute value of a pixel value difference between a second pixel and a first pixel, of the relating pixels, at another side with reference to the boundary,
(iv) an absolute value of a pixel value difference between a third pixel and the second pixel, of the relating pixels, at the one side with reference to the boundary, and
(v) an absolute value of a pixel value difference between a third pixel and the second pixel, of the relating pixels, at the another side with reference to the boundary, and
selecting a candidate direction with a smallest pixel value difference, among the plurality of candidate directions, as said each corresponding filtering direction.

8. The deblocking filtering method of claim 6, wherein the step of performing the determination of whether to perform the filtering includes
determining whether to perform the filtering depending on whether the relationships between pixel values of the selected pixels satisfy the first condition that
(i) an absolute value of a pixel value difference between two first pixels, of the selected pixels, facing each other with reference to the boundary,
(ii) an absolute value of a pixel value difference between a second pixel and a first pixel, of the selected pixels, both at one side with reference to the boundary, and (iii) an absolute value of a pixel value difference between a second pixel and a first pixel, of the selected pixels, at another side with reference to the boundary are smaller than thresholds respectively preset.

9. The deblocking filtering method of claim 6, wherein when the determined filtering direction does not satisfy the first condition, the step of performing the determination of whether to perform the filtering includes performing a check if a vertical direction of the boundary satisfies a second condition on a relationship between pixel values of the selected pixels for filtering with respect to the vertical direction performing a filtering with respect to the vertical direction according to the check.

10. The deblocking filtering method of claim 6, wherein the plurality of candidate directions include 45 degrees, 56.25 degrees, 67.5 degrees, 78.75 degrees, 90 degrees, 101.25 degrees, 112.5 degrees, 123.75 degrees, and 135 degrees with respect to a horizontal direction.

11. A video encoding apparatus comprising a microprocessor configured to:

predict a current block of an image to generate a predicted block;

subtract the predicted block from the current block to generate a residual block;

perform a transform on the residual block into a frequency domain;

perform a quantization on the residual block after the transform;

encode the residual block after the quantization;

perform an inverse quantization on the residual block;

perform an inverse transform on the residual block after the inverse quantization into a residual block having pixel signals on time axis;

add the predicted block to the residual block after the inverse transform to perform a reconstruction of the current block;

perform a deblocking filtering of the current block after the reconstruction by determining a boundary among four boundaries corresponding to four sides of the current block, the determined boundary being located between the current block and a neighboring block adjacent to the current block;

determining a plurality of corresponding filtering directions for boundary pixels along and in the determined boundary of the current block by selecting, per each boundary pixel of the boundary pixels, each of the plurality of corresponding filtering directions from among a plurality of candidate directions based on each pixel value difference between relating pixels positioned, with respect to said each boundary pixel, in every direction of the plurality of the candidate directions, determining a filtering direction for the boundary of the current block, by selecting the determined filtering direction mostly selected from among the plurality of the determined corresponding filtering directions for said each boundary pixel of the boundary pixels, wherein each of the plurality of the determined corresponding filtering directions corresponds to said each corresponding filtering direction for said each boundary pixel of the boundary pixels, selecting pixels for filtering based on the determined filtering direction, with respect to said each boundary pixel of the boundary pixels, determining whether to perform the filtering for the determined filtering direction depending on a first condition on a relationship between pixel values of the selected pixels for filtering, with respect to said each pixel of the pixels in the boundary of the current block, and performing the filtering with respect to the selected pixels for filtering in the determined filtering direction depending on the determination of whether to perform the filtering, the filtering being performed, for all the boundary pixels, in the same determined filtering direction, wherein said each pixel value difference is calculated corresponding to said each boundary pixel of the boundary pixels.

12. A non-transitory computer readable medium storing a computer program comprising functions of:

determining a boundary among four boundaries corresponding to four sides of a current block, the determined boundary being located between the current block and a neighboring block adjacent to the current block;

determining a plurality of corresponding filtering directions for boundary pixels along and in the determined boundary of the current block by selecting, per each boundary pixel of the boundary pixels, each of the plurality of corresponding filtering directions from among a plurality of candidate directions based on each pixel value difference between relating pixels positioned, with respect to said each boundary pixel, in every direction of the plurality of candidate directions;

determining a filtering direction for the boundary of the current block, by selecting the determined filtering direction mostly selected from among the plurality of the determined corresponding filtering directions for said each boundary pixel of the boundary pixels, wherein each of the plurality of the determined corresponding filtering directions corresponds to said each corresponding filtering direction for said each boundary pixel of the boundary pixels;

selecting pixels for filtering based on the determined filtering direction, with respect to said each boundary pixel of the boundary pixels;

determining whether to perform the filtering for the determined filtering direction depending on a first condition on a relationship between pixel values of the selected pixels for filtering, with respect to said each boundary pixel of the boundary pixels; and performing the filtering with respect to the selected pixels for filtering in the determined filtering direction depending on the determination of whether to perform the filtering, the filtering being performed, for all the boundary pixels, in the same determined filtering direction, wherein said each pixel value difference is calculated corresponding to said each boundary pixel of the boundary pixels.

\* \* \* \* \*